United States Patent
Mochizuki

(10) Patent No.: US 12,096,534 B2
(45) Date of Patent: Sep. 17, 2024

(54) VEHICLE INFRARED LAMP SYSTEM, VEHICLE INFRARED SENSOR SYSTEM, VEHICLE INFRARED-SENSOR-EQUIPPED LAMP, AND OPTICAL-SENSOR-EQUIPPED LAMP

(71) Applicant: KOITO MANUFACTURING CO., LTD., Tokyo (JP)

(72) Inventor: Mitsuyuki Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 190 days.

(21) Appl. No.: 17/761,887

(22) PCT Filed: Sep. 14, 2020

(86) PCT No.: PCT/JP2020/034656
§ 371 (c)(1),
(2) Date: Mar. 18, 2022

(87) PCT Pub. No.: WO2021/054276
PCT Pub. Date: Mar. 25, 2021

(65) Prior Publication Data
US 2022/0338327 A1    Oct. 20, 2022

(30) Foreign Application Priority Data

Sep. 19, 2019 (JP) ................. 2019-170540
Sep. 19, 2019 (JP) ................. 2019-170541
(Continued)

(51) Int. Cl.
*H05B 47/10* (2020.01)
*B60Q 1/00* (2006.01)
(Continued)

(52) U.S. Cl.
CPC ......... *H05B 47/125* (2020.01); *B60Q 1/0023* (2013.01); *G02B 19/0009* (2013.01);
(Continued)

(58) Field of Classification Search
CPC .. H05B 47/115; H05B 47/125; H05B 47/135; B60Q 1/143; B60Q 1/249; B60Q 1/1423; B60Q 2300/41; B60Q 2300/056
See application file for complete search history.

(56) References Cited

U.S. PATENT DOCUMENTS 8,525,445 B2 * 9/2013 Oishi ................ B60Q 1/143
315/307
11,009,734 B2 * 5/2021 Toko ................ F21S 41/645
(Continued)

FOREIGN PATENT DOCUMENTS

EP    4 030 154 A1    7/2022
JP    2004-51057 A    2/2004
(Continued)

OTHER PUBLICATIONS

International Search Report (PCT/ISA/210) dated Nov. 17, 2020, issued by the International Searching Authority in counterpart International Application No. PCT/JP2020/034656.
(Continued)

*Primary Examiner* — Tung X Le
(74) *Attorney, Agent, or Firm* — Sughrue Mion, PLLC

(57) ABSTRACT

A vehicle infrared lamp system mounted on a vehicle equipped with an infrared camera includes: an infrared light source; a rotating reflector; an other-vehicle position acquisition unit configured to acquire position information of another vehicle; and a control unit configured to control a lighting state of the infrared light source based on the position information of the other vehicle acquired by the other-vehicle position acquisition unit such that a dimming
(Continued)

region where radiant intensity of infrared light is lower than radiant intensity of any other region is formed on at least a part of the other vehicle.

16 Claims, 26 Drawing Sheets

(30) Foreign Application Priority Data

Oct. 3, 2019 (JP) ................................. 2019-183066
Oct. 3, 2019 (JP) ................................. 2019-183067

(51) Int. Cl.
*G02B 19/00* (2006.01)
*H04N 5/33* (2023.01)
*H05B 45/325* (2020.01)
*H05B 47/125* (2020.01)
*B60Q 1/04* (2006.01)

(52) U.S. Cl.
CPC ........... *G02B 19/0076* (2013.01); *H04N 5/33* (2013.01); *H05B 45/325* (2020.01); *B60Q 1/04* (2013.01)

(56) References Cited

U.S. PATENT DOCUMENTS

| 2009/0015388 | A1 | 1/2009 | Yagi et al. |
| 2009/0043458 | A1* | 2/2009 | Kamioka ............... B60Q 1/085 |
| | | | 701/49 |
| 2013/0177202 | A1* | 7/2013 | Dierks .................... B60Q 1/16 |
| | | | 362/466 |
| 2014/0042325 | A1 | 2/2014 | Yamamura |
| 2015/0137680 | A1 | 5/2015 | Komatsu et al. |
| 2015/0350572 | A1 | 12/2015 | Hattori et al. |
| 2016/0368414 | A1* | 12/2016 | Son ........................ F21S 41/663 |
| 2017/0043702 | A1* | 2/2017 | Park ....................... B60Q 1/076 |
| 2017/0144591 | A1* | 5/2017 | Yatsu ................... H04N 9/3185 |
| 2018/0264990 | A1 | 9/2018 | Mouri et al. |
| 2018/0354408 | A1* | 12/2018 | Sung .................... B60Q 1/1423 |
| 2020/0148094 | A1* | 5/2020 | Boehm ................ H05B 47/125 |
| 2020/0301012 | A1 | 9/2020 | Yamamoto et al. |

FOREIGN PATENT DOCUMENTS

| JP | 2008-252784 A | 10/2008 |
| JP | 2009-18726 A | 1/2009 |
| JP | 2010-97410 A | 4/2010 |
| JP | 2011-40174 A | 2/2011 |
| JP | 2011-157022 A | 8/2011 |
| JP | 2014-127924 A | 7/2014 |
| JP | 2018-156862 A | 10/2018 |
| WO | 2012/144144 A1 | 10/2012 |
| WO | 2014/024385 A1 | 2/2014 |
| WO | 2018/051906 A1 | 3/2018 |

OTHER PUBLICATIONS

Written Opinion (PCT/ISA/237) dated Nov. 17, 2020, issued by the International Searching Authority in counterpart International Application No. PCT/JP2020/034656.

Communication dated Sep. 27, 2022 issued by the European Patent Office in counterpart European Application No. 20866212.2.

* cited by examiner

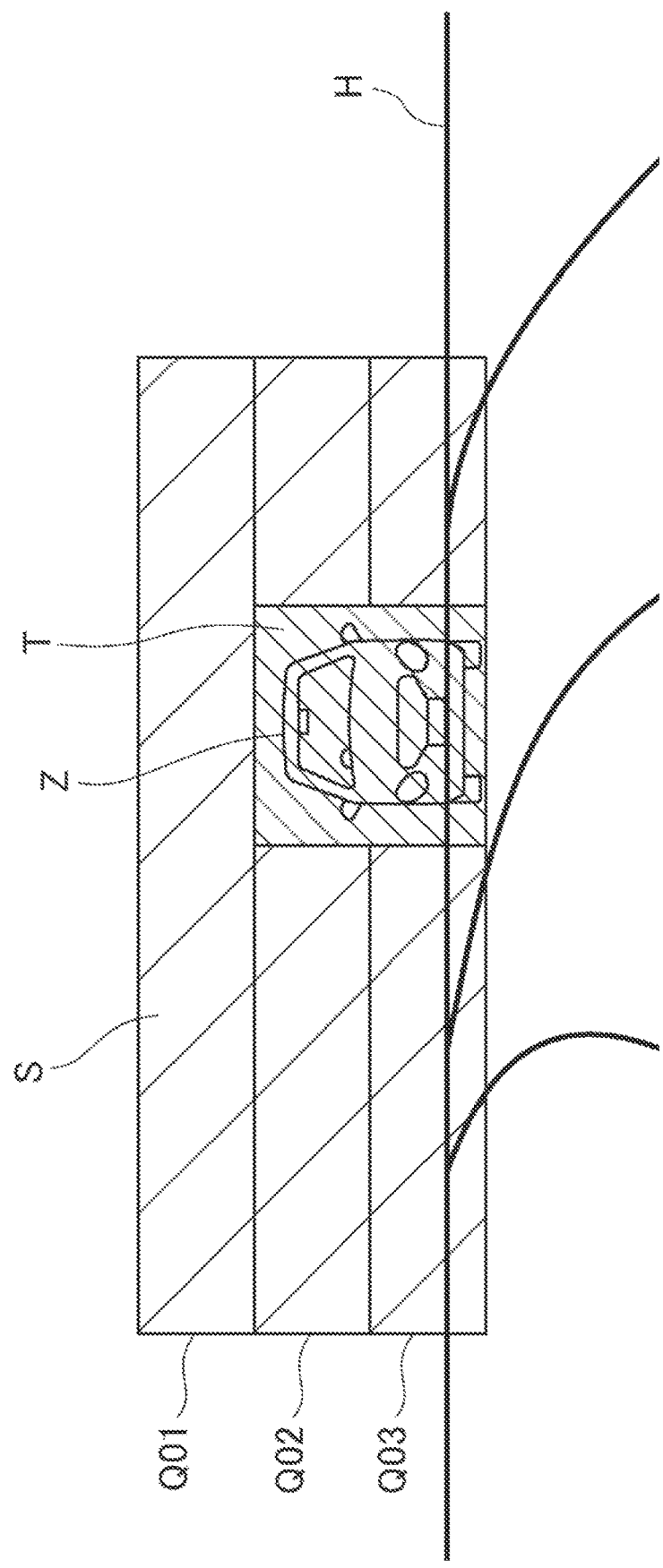

VEHICLE INFRARED LAMP SYSTEM, VEHICLE INFRARED SENSOR SYSTEM, VEHICLE INFRARED-SENSOR-EQUIPPED LAMP, AND OPTICAL-SENSOR-EQUIPPED LAMP

CROSS-REFERENCE TO RELATED APPLICATIONS

This application is a National Phase Entry of PCT International Application No. PCT/JP2020/034656, filed on Sep. 14, 2020, which claims priority to Japanese Patent Application No. 2019-170540 filed on Sep. 19, 2019, Japanese Patent Application No. 2019-170541 filed on Sep. 19, 2019, Japanese Patent Application No. 2019-183066 filed on Oct. 3, 2019, and Japanese Patent Application No. 2019-183067 filed on Oct. 3, 2019, the contents of all of which are incorporated herein by reference in their entirety.

TECHNICAL FIELD

The present invention relates to a vehicle infrared lamp system used in a vehicle such as an automobile, a vehicle infrared sensor system, a vehicle infrared-sensor-equipped lamp, and an optical-sensor-equipped lamp.

BACKGROUND ART

A night vision device is known in Patent Literature 1 and the like.

CITATION LIST

Patent Literature

Patent Literature 1: JP2014-127924A

SUMMARY OF INVENTION

Technical Problem

Incidentally, infrared light is emitted or intensity of the emitted infrared light is increased in order for a certain vehicle to sharpen an image obtained by infrared light. However, in a case where another vehicle such as an oncoming vehicle or a preceding vehicle is located in front of the own vehicle, if the other vehicle is irradiated with infrared light, the infrared light is reflected at high intensity, and thus halation occurs in an image captured by an infrared camera of the own vehicle. When the halation occurs in this way, an image without halation can be obtained by reducing sensitivity of the infrared camera. However, in an image obtained in this case from the infrared camera, an object having low intensity of reflection such as a pedestrian may not be captured.

An object of the present invention is to provide a vehicle infrared lamp system capable of detecting an object having low infrared reflection intensity while preventing occurrence of halation in an image captured by an infrared camera.

Solution to Problem

A vehicle infrared lamp system according to a first aspect of the present invention is a vehicle infrared lamp system mounted on a vehicle equipped with an infrared camera, including:

an infrared light source configured to emit infrared light;
an optical member configured to transmit the infrared light emitted from the infrared light source to a lamp front side;
an other-vehicle position acquisition unit configured to acquire position information of another vehicle such as an oncoming vehicle or a preceding vehicle; and a control unit configured to control a lighting state of the infrared light source based on the position information of the oncoming vehicle or the preceding vehicle acquired by the other-vehicle position acquisition unit such that a dimming region where radiant intensity of infrared light is lower than radiant intensity of any other region is formed on at least a part of the oncoming vehicle or the preceding vehicle.

According to the present invention, it is possible to provide the vehicle infrared lamp system capable of detecting an object having low infrared reflection intensity while preventing occurrence of halation in an image captured by the infrared camera.

A vehicle infrared sensor system according to a second aspect of the present invention is a vehicle infrared sensor system used in a vehicle equipped with an infrared camera and an infrared sensor, including:
an infrared light source;
an optical member configured to transmit infrared light emitted from the infrared light source to a lamp front side; and
a control unit configured to control a lighting state of the infrared light source.
The control unit is configured to drive the infrared light source in a first mode suitable for imaging with the infrared camera and a second mode suitable for sensing with the infrared sensor, and
the control unit sets a dimming region where radiant intensity of infrared light is lower than that of any other region when driving in the first mode in accordance with output of the infrared sensor.

According to the present invention, it is possible to provide the vehicle infrared sensor system capable of emitting light suitable for the infrared camera and the infrared sensor from a common light source.

A vehicle infrared-sensor-equipped lamp according to a third aspect of the present invention includes:
a visible light unit including a visible light source configured to emit visible light;
a projection lens configured to transmit visible light forward;
a reflective infrared cut filter; and
an infrared sensor configured to detect infrared light.
The infrared cut filter is disposed between the visible light source and the projection lens,
the infrared sensor is disposed in the vicinity of a virtual focal point of the projection lens folded back by the infrared cut filter, and
the visible light emitted from the visible light source passes through the infrared cut filter and is incident on the projection lens, and infrared light incident on the infrared cut filter from a lamp front side through the projection lens is reflected toward the infrared sensor.

According to the present invention, it is possible to provide the vehicle infrared-sensor-equipped lamp including the infrared sensor, which is less likely to cause an increase in size and weight of a vehicle.

An optical-sensor-equipped lamp according to a fourth aspect of the present invention includes:
- a first light source;
- an optical sensor;
- a second light source configured to emit light having a peak wavelength different from a peak wavelength of light emitted from the first light source and having a wavelength with high light receiving sensitivity of the optical sensor;
- a scanning unit configured to transmit the light emitted from the first light source and the light emitted from the second light source to a lamp front side to perform scanning;
- a projection lens configured to project the light emitted from the scanning unit to the lamp front side;
- a first board on which the first light source is disposed, the first board having a function of supplying power to the first light source; and
- a second board on which the second light source is disposed, the second board having a function of supplying power to the second light source.

The second board is provided behind the first board when viewed from the scanning unit, and
the first board is provided with a gap portion through which the light emitted from the second light source is transmitted to the scanning unit.

According to the present invention, the optical-sensor-equipped lamp whose increase in size is prevented and whose installation on a vehicle is improved can be provided.

Advantageous Effects of Invention

According to the present invention, it is possible to provide the vehicle infrared lamp system capable of detecting an object having low infrared reflection intensity while preventing occurrence of halation in an image captured by an infrared camera.

BRIEF DESCRIPTION OF DRAWINGS

FIG. 26 is a schematic view showing an example of a light distribution pattern obtained by controlling a visible light LED by the control unit.

DESCRIPTION OF EMBODIMENTS

Figure 1:
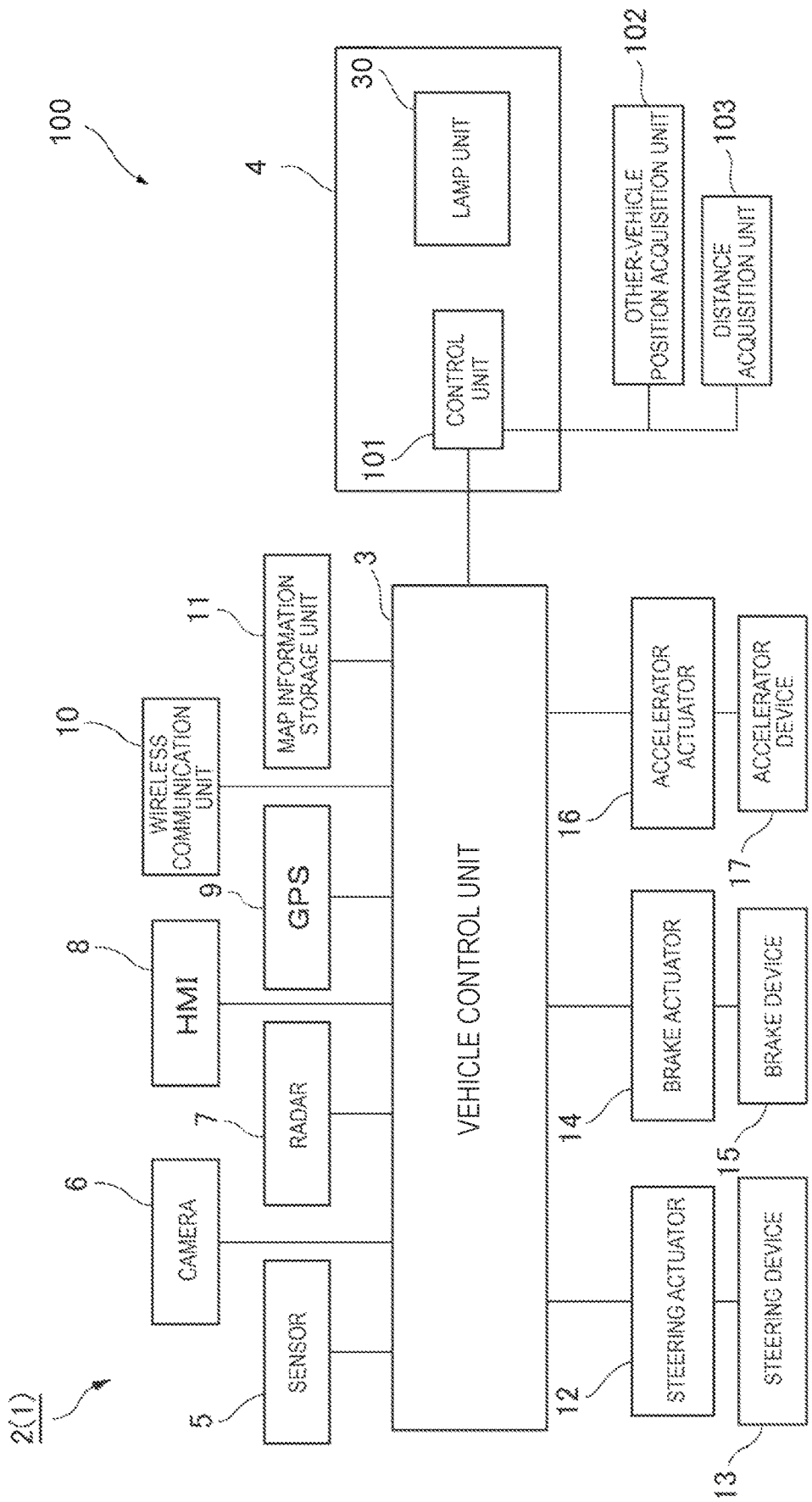
FIG. 1 is a block diagram showing a vehicle system in which a vehicle infrared lamp system according to a first embodiment of the present invention is incorporated.

Hereinafter, the present invention will be described based on embodiments with reference to the drawings. The same or equivalent components, members, and processes shown in the drawings are denoted by the same reference numerals, and repeated description thereof will be appropriately omitted. In addition, the embodiments are exemplary and are not intended to limit the invention, and all the features and combinations described in the embodiments are not necessarily essential to the invention.

First Embodiment

FIG. 1 is a block diagram of a vehicle system 2 in which a vehicle infrared lamp system 100 according to an embodiment of the present invention is incorporated. A vehicle 1 on which the vehicle system 2 is mounted is a vehicle (automobile) that can travel in an automatic driving mode. As shown in FIG. 1, the vehicle system 2 includes a vehicle control unit 3, a sensor 5, a camera 6, a radar 7, a human machine interface (HMI) 8, a global positioning system (GPS) 9, a wireless communication unit 10, and a map information storage unit 11. The vehicle system 2 also includes a steering actuator 12, a steering device 13, a brake actuator 14, a brake device 15, an accelerator actuator 16, and an accelerator device 17. Further, the vehicle system 2 includes the vehicle infrared lamp system 100.

The vehicle control unit 3 is configured to control traveling of the vehicle 1. The vehicle control unit 3 is constituted by, for example, an electronic control unit (ECU). The electronic control unit includes a microcontroller that includes a processor and a memory, and other electronic circuits (for example, a transistor and the like). The processor is, for example, a central processing unit (CPU), a micro processing unit (MPU), and/or a graphics processing unit (GPU). The memory includes a read only memory (ROM) in which various vehicle control programs (for example, an automatic driving artificial intelligence (AI) program and the like) are stored, and a random access memory (RAM) in which various types of vehicle control data are temporarily stored. The processor is configured to load a program specified from the various vehicle control programs stored in the ROM onto the RAM and execute various types of processing in cooperation with the RAM.

The sensor 5 includes an acceleration sensor, a speed sensor, a gyro sensor, and the like. The sensor 5 is configured to detect a traveling state of the vehicle 1 and output traveling state information to the vehicle control unit 3. The sensor 5 may further include a seating sensor that detects whether a driver is seated in a driver seat, a face direction sensor that detects a direction of a face of the driver, an external weather sensor that detects an external weather condition, a human sensor that detects whether a person is present in the vehicle, and the like. Further, the sensor 5 may include an illuminance sensor that detects illuminance of a surrounding environment of the vehicle 1.

The camera (in-vehicle camera) 6 is, for example, a camera including an imaging element such as a charge-coupled device (CCD) or a complementary MOS (CMOS). Imaging of the camera 6 is controlled based on a signal transmitted from the vehicle control unit 3. The camera 6 can generate an image based on received visible light. The camera 6 may also be an infrared camera that detects infrared light.

The radar 7 is a millimeter wave radar, a microwave radar, a laser radar, or the like. The radar 7 may include light detection and ranging or laser imaging detection and ranging (LiDAR). In general, the LiDAR is a sensor that emits invisible light forward and acquires information such as a distance to an object, a shape of the object, and a material of the object based on the emitted light and returned light. The camera 6 and the radar 7 (an example of a sensor) are configured to detect the surrounding environment (another vehicle, a pedestrian, a road shape, a traffic sign, an obstacle, or the like) of the vehicle 1 and output surrounding environment information to the vehicle control unit 3.

The HMI 8 includes an input unit that receives an input operation from the driver and an output unit that outputs traveling information or the like to the driver. The input unit includes a steering wheel, an accelerator pedal, a brake pedal, a driving mode changeover switch for switching a driving mode of the vehicle 1, and the like. The output unit is a display that displays various types of traveling information.

The GPS 9 is configured to acquire current position information of the vehicle 1 and output the acquired current position information to the vehicle control unit 3. The wireless communication unit 10 is configured to receive information (for example, traveling information) on another vehicle around the vehicle 1 from the other vehicle and transmit information (for example, traveling information) on the vehicle 1 to the other vehicle (vehicle-to-vehicle communication). In addition, the wireless communication unit 10 is configured to receive infrastructure information from infrastructure equipment such as a traffic light or an indicator light, and to transmit the traveling information of the vehicle 1 to the infrastructure equipment (road-to-vehicle communication). The map information storage unit 11 is an external storage device such as a hard disk drive in which map information is stored, and is configured to output the map information to the vehicle control unit 3.

When the vehicle 1 travels in the automatic driving mode, the vehicle control unit 3 automatically generates at least one of a steering control signal, an accelerator control signal, and a brake control signal based on the traveling state information, the surrounding environment information, the current position information, the map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, in the automatic driving mode, the traveling of the vehicle 1 is automatically controlled by the vehicle system 2.

On the other hand, when the vehicle 1 travels in a manual driving mode, the vehicle control unit 3 generates the steering control signal, the accelerator control signal, and the brake control signal in accordance with a manual operation of the driver performed on the accelerator pedal, the brake pedal, and the steering wheel. In this way, in the manual driving mode, since the steering control signal, the accelerator control signal, and the brake control signal are generated by the manual operation of the driver, the traveling of the vehicle 1 is controlled by the driver.

Next, each driving mode of the vehicle 1 will be described. The driving mode includes the automatic driving mode and the manual driving mode. The automatic driving mode includes a fully automatic driving mode, an advanced driving support mode, and a driving support mode. In the fully automatic driving mode, the vehicle system 2 automatically performs all traveling control including steering control, brake control, and accelerator control, and the driver cannot drive the vehicle 1. In the advanced driving support mode, the vehicle system 2 automatically performs all traveling control including the steering control, the brake control, and the accelerator control, and the driver can drive the vehicle 1 but does not drive the vehicle 1. In the driving support mode, the vehicle system 2 automatically performs a part of the steering control, the brake control, and the accelerator control, and the driver drives the vehicle 1 under driving support of the vehicle system 2. On the other hand, in the manual driving mode, the vehicle system 2 does not automatically perform the traveling control, and the driver drives the vehicle 1 without the driving support of the vehicle system 2.

In addition, the driving mode of the vehicle 1 may be switched by operating the driving mode changeover switch. In this case, the vehicle control unit 3 switches the driving mode of the vehicle 1 between the four driving modes (the fully automatic driving mode, the advanced driving support mode, the driving support mode, and the manual driving mode) according to an operation performed by the driver on the driving mode changeover switch. In addition, the driving mode of the vehicle 1 may be automatically switched based on information on a traveling permitted section where a self-driving vehicle can travel or on a traveling prohibited section where traveling of the self-driving vehicle is prohibited, or information on an external weather condition. In this case, the vehicle control unit 3 switches the driving mode of the vehicle 1 based on such information. Further, the driving mode of the vehicle 1 may be automatically switched by using a seating sensor, a face direction sensor, or the like. In this case, the vehicle control unit 3 switches the driving mode of the vehicle 1 based on an output signal from the seating sensor or the face direction sensor.

The vehicle infrared lamp system 100 includes a vehicle infrared lamp 4, and an other-vehicle position acquisition unit 102 and a distance acquisition unit 103 connected to the vehicle infrared lamp 4.

The vehicle infrared lamp 4 includes a lamp unit 30 capable of emitting infrared light, and a control unit 101 that controls each part of the vehicle infrared lamp 4. The vehicle infrared lamp 4 is mounted on a front portion of the vehicle 1.

The other-vehicle position acquisition unit 102 is an acquisition unit that acquires position information of another vehicle (including, for example, a preceding vehicle, an oncoming vehicle, and the like). The other-vehicle position acquisition unit 102 acquires the position information of the other vehicle based on an image captured by an infrared camera, a visible light camera, or the like (an example of the in-vehicle camera 6) mounted on the vehicle 1, for example. In addition, the other-vehicle position acquisition unit 102 acquires the position information of the other vehicle based on, for example, information acquired by the LiDAR (an example of the radar 7).

The distance acquisition unit 103 is an acquisition unit that acquires a distance between the other vehicle and the own vehicle 1. For example, the distance acquisition unit 103 acquires distance information relative to the other vehicle based on the information acquired by the LiDAR. In addition, the distance acquisition unit 103 acquires the distance information relative to the other vehicle by analyzing the image captured by the in-vehicle camera 6, for example.

The other-vehicle position acquisition unit 102 and the distance acquisition unit 103 are connected to the control unit 101 of the vehicle infrared lamp 4. The lamp unit 30, the other-vehicle position acquisition unit 102, and the distance acquisition unit 103 are controlled by the control unit 101. Although the other-vehicle position acquisition unit 102 and the distance acquisition unit 103 are configured independently of the control unit 101 in the present embodiment, the other-vehicle position acquisition unit 102 and the distance acquisition unit 103 may be configured to be included in the control unit 101 as a processing unit that executes processing of the control unit 101, for example.

Figure 2:
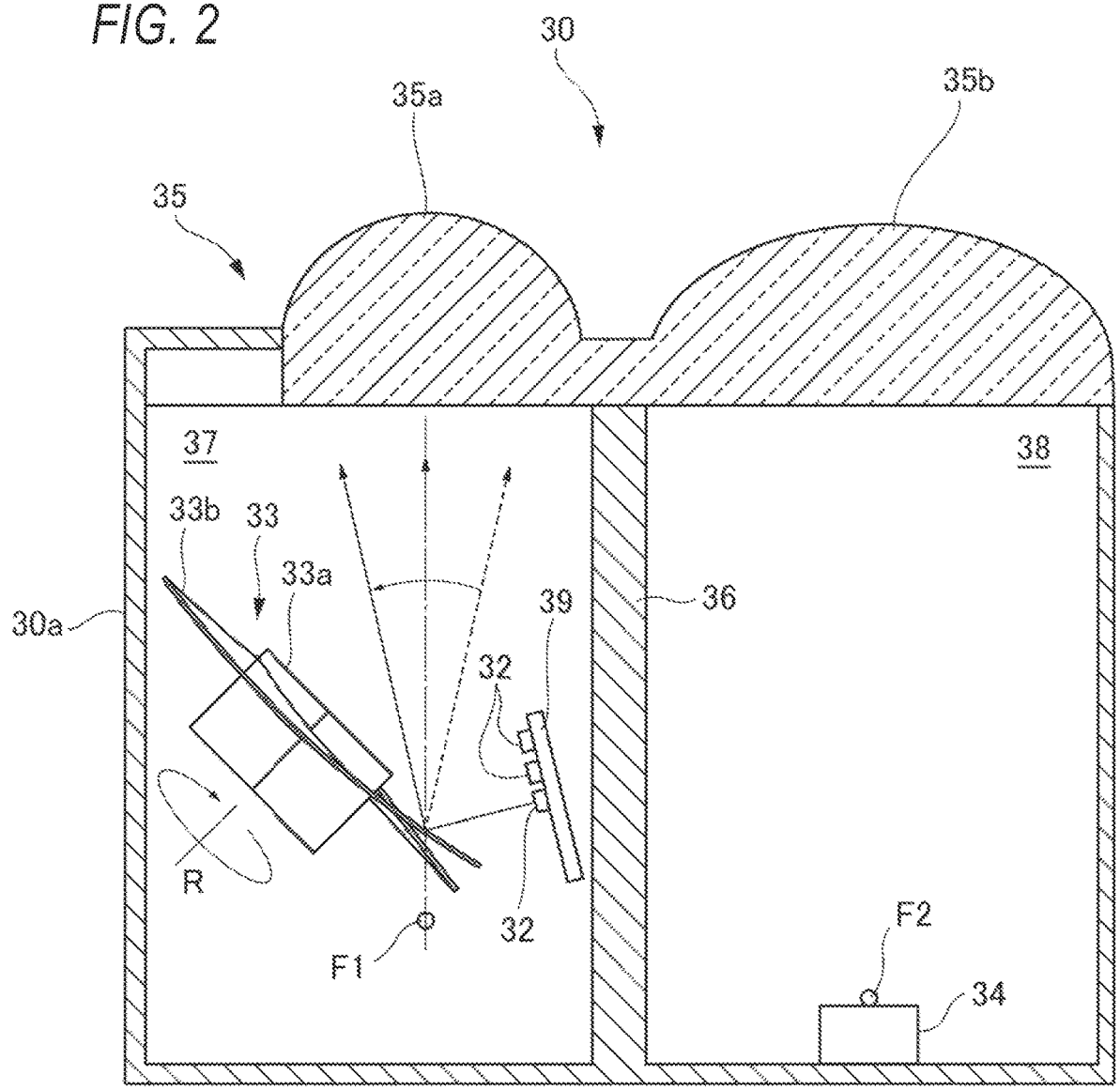
FIG. 2 is a schematic view showing an internal configuration of a lamp unit mounted on a vehicle lamp.

FIG. 2 is a schematic view showing an internal configuration of the lamp unit 30 mounted on the vehicle infrared lamp 4. As shown in FIG. 2, the lamp unit 30 includes a housing 30*a*, an infrared light source 32, a rotating reflector 33 (an example of an optical member), an infrared camera 34, a lens component 35, and a light shielding wall 36.

An inside of the housing 30*a* is partitioned by the light shielding wall 36 into two spaces, namely a first lamp chamber 37 and a second lamp chamber 38. The infrared light source 32 and the rotating reflector 33 are provided in the first lamp chamber 37. The infrared camera 34 is provided in the second lamp chamber 38.

The infrared light source 32 is constituted by a light emitting diode (LED) that emits infrared light. The infrared light source 32 may also be constituted by a laser diode (LD) that emits infrared light. In a case where the infrared light source 32 is required to irradiate a wide range, it is preferable to use an LED whose emitted light has a large degree of diffusion. In a case where the infrared light source 32 is required to perform sensing of another vehicle or the like, it is preferable to use an LD whose emitted light has a small degree of diffusion. The infrared light source 32 is mounted on aboard 39. As the infrared light source 32, for example, three infrared light sources 32 are arranged in a plurality of rows on a virtual straight line extending in a vertical direction on the board 39. As the infrared light source 32, an LED or an LD may be provided for each row. Lighting timings of the infrared light sources 32 arranged on the board 39 in the vertical direction and a horizontal direction are controlled by the control unit 101.

Figure 4:
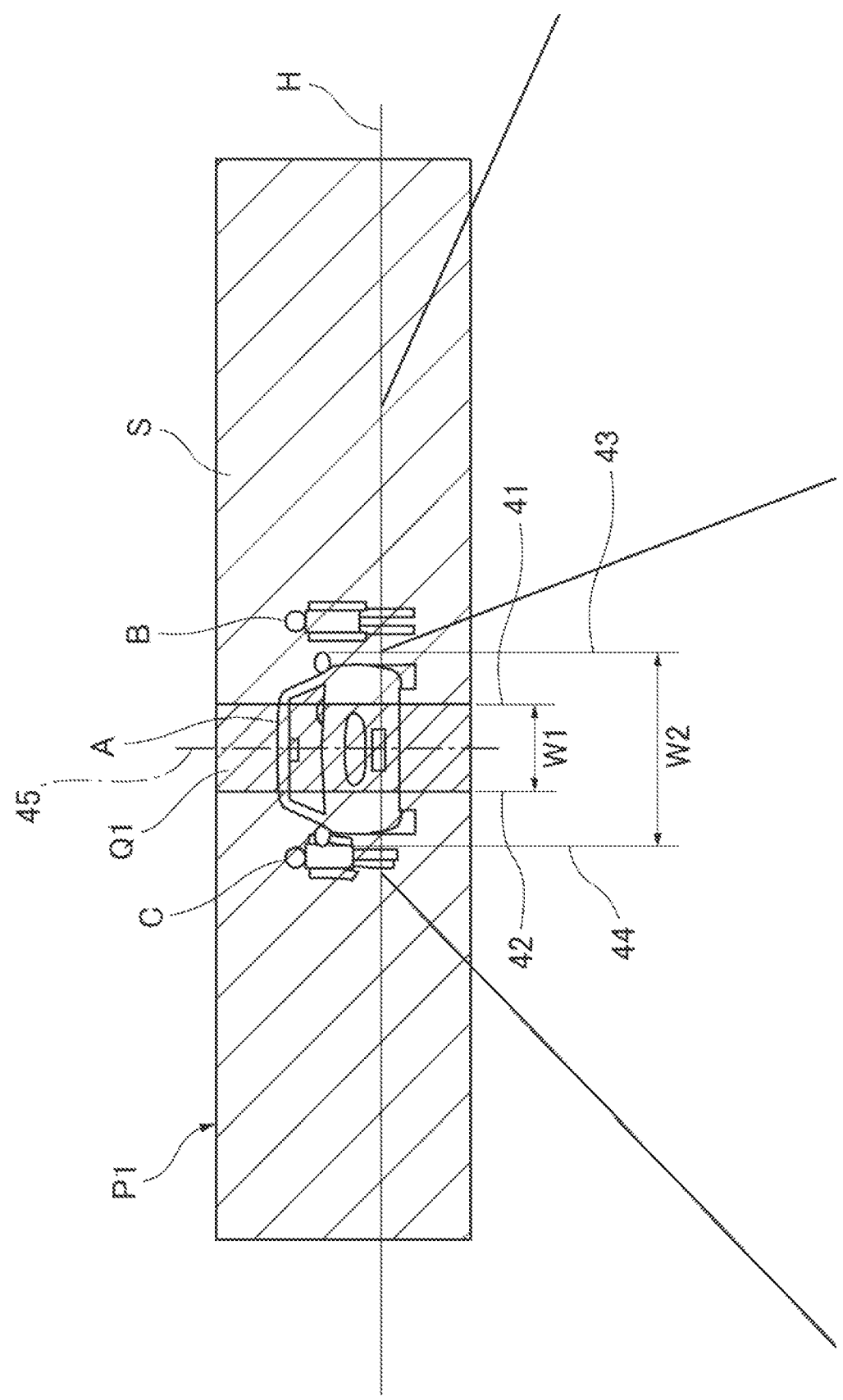
FIG. 4 shows an example of a light distribution pattern with which another vehicle is irradiated.

The rotating reflector 33 is a scanning unit that transmits the infrared light emitted from the infrared light source 32 toward a lamp front side to perform scanning. The rotating reflector 33 rotates around a rotation axis R. The rotating reflector 33 includes a shaft portion 33*a* extending around the rotation axis R and two blades 33*b* extending radially from the shaft portion 33*a*. A surface of each blade 33*b* is a reflecting surface. The reflecting surface has a twisted shape whose angle relative to the rotation axis R gradually changes in a circumferential direction. Specifically, when the infrared light emitted from the infrared light source 32 is reflected by the reflecting surface of the rotating reflector 33, a direction in which the infrared light is reflected and transmitted gradually changes from a left end to a right end. As a result, the lamp unit 30 can emit light from the infrared light source 32 to a region in a predetermined range to perform scanning. For example, the lamp unit 30 can irradiate an irradiable range P1 with infrared light as shown in FIG. 4.

The lens component 35 is provided in front of the housing 30*a*. The lens component 35 includes a first lens element 35*a* and a second lens element 35*b*. The first lens element 35*a* is disposed in front of the first lamp chamber 37. Light emitted from the infrared light source 32 and reflected by the rotating reflector 33 is incident on the first lens element 35*a*. The first lens element 35*a* transmits the incident light of the infrared light source 32 toward the lamp front side. A reflection point of the rotating reflector 33 is disposed in the vicinity of a focal point of the first lens element 35*a*. The second lens element 35*b* is disposed in front of the second lamp chamber 38. The second lens element 35*b* collects light from the lamp front side, for example, reflected light reflected by an object such as another vehicle, and guides the collected light to the infrared camera 34. A light receiving surface of the infrared camera 34 is disposed in the vicinity of a focal point of the second lens element 35*b*. A distance between the first lens element 35*a* and a rear focal point F1 thereof is shorter than a distance between the second lens element 35*b* and a rear focal point F2 thereof. The first lens element 35*a* and the second lens element 35*b* are integrally formed as the single lens component 35.

The infrared camera 34 is a camera having highest sensitivity to a peak wavelength of the infrared light emitted from the infrared light source 32. The infrared camera 34 outputs a signal corresponding to intensity of the received infrared light. The infrared camera 34 can acquire an image corresponding to the reflected light of the infrared light emitted from the infrared light source 32 to the lamp front side. The image acquired by the infrared camera 34 is transmitted to the control unit 101.

The light shielding wall 36 is provided between an optical axis of the first lens element 35*a* and an optical axis of the second lens element 35*b*. For example, the light shielding wall 36 is provided at a position where the light shielding wall 36 shields light that is emitted from the infrared light source 32 and is about to be incident on the infrared camera 34 without being incident on the first lens element 35*a*.

Figure 3:
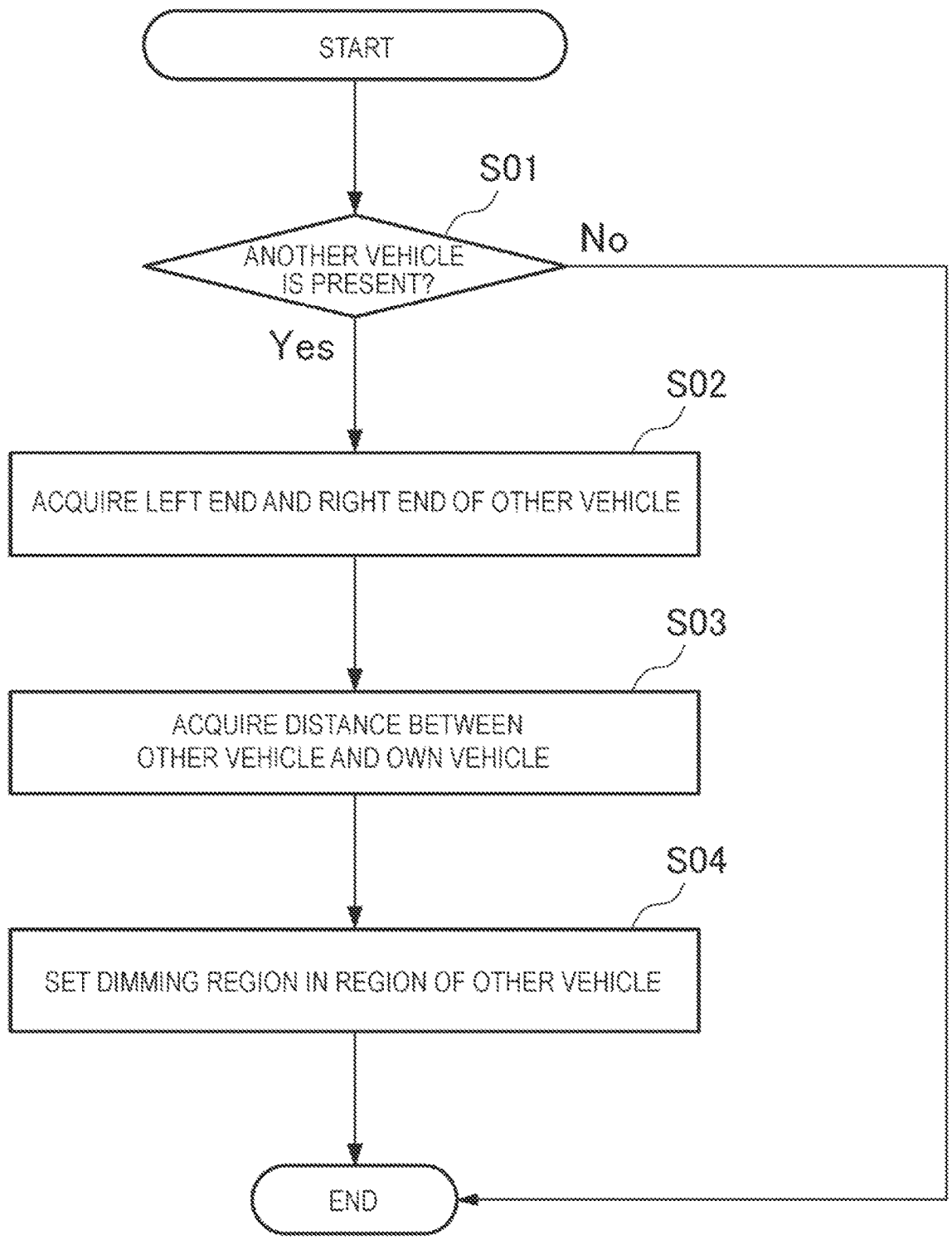
FIG. 3 is a flowchart showing an example of a process executed by the vehicle infrared lamp system.

An operation example of the vehicle infrared lamp system 100 will be described with reference to FIGS. 3 and 4. FIG. 3 is a flowchart showing an example of a process executed by the vehicle infrared lamp system 100. FIG. 4 shows an example of a light distribution pattern radiated from the lamp unit 30 of the vehicle 1 toward another vehicle.

During traveling of the vehicle 1, the control unit 101 of the vehicle infrared lamp system 100 sets a normal region in all regions of the maximum range (hereinafter, referred to as the irradiable range) P1 that can be irradiated with infrared light by the vehicle infrared lamp 4 in a normal state. The control unit 101 of the vehicle infrared lamp system 100 supplies, for example, a current having a first current value to the infrared light source 32 that irradiates a region corresponding to the normal region, and causes the infrared light source 32 to irradiate infrared light at certain illuminance.

Immediately after the vehicle 1 starts to travel, the normal region is set in all the regions of the irradiable range P1 as described above, and the irradiable range P1 is irradiated with infrared light with uniform illuminance. In this state, an image of the front of the own vehicle 1 is captured by the infrared camera 34. The image captured by the infrared camera 34 is transmitted to the control unit 101.

The control unit 101 determines whether another vehicle is present in the captured image based on the image captured by the infrared camera 34 (step S01). For example, the control unit 101 determines that another vehicle is present in a pixel having luminance equal to or higher than a predetermined value in the image acquired by the infrared camera 34, and specifies a position corresponding to the pixel as a position of the other vehicle. In addition, the control unit 101 may specify the position of the other vehicle with reference to an azimuth angle formed by an object viewed from a reference point of the own vehicle 1 in the image captured by the infrared camera 34. Alternatively, the position of the other vehicle may be specified based on a region having a plurality of pixels occupied by the object in the image captured by the infrared camera 34.

When it is determined that there is no other vehicle in the captured image (step S01: No), the control unit 101 ends the process in a state where the normal region is maintained in all the regions of the irradiable range P1.

On the other hand, when it is determined that the other vehicle is present in the captured image (step S01: Yes), the control unit 101 transmits the image captured by the infrared camera 34 to the other-vehicle position acquisition unit 102 and the distance acquisition unit 103 together with information on the detected other vehicle.

In the present example, as shown in FIG. 4, it is assumed that an image in which another vehicle A is present in front of the own vehicle 1 is captured by the infrared camera 34. Therefore, the control unit 101 detects the other vehicle in step S01.

The other-vehicle position acquisition unit 102 acquires position information of a left end portion and position information of a right end portion of the detected other vehicle A based on the image captured by the infrared camera 34 (step S02). The acquired position information of the other vehicle is transmitted from the other-vehicle position acquisition unit 102 to the control unit 101.

The distance acquisition unit 103 acquires distance information between the detected other vehicle A and the own vehicle 1 based on the image captured by the infrared camera 34 (step S03). The acquired distance information of the other vehicle A is transmitted from the distance acquisition unit 103 to the control unit 101.

Based on the position information of the other vehicle A acquired by the other-vehicle position acquisition unit 102 and the distance information of the other vehicle A acquired by the distance acquisition unit 103, the control unit 101 sets at least a partial region of the other vehicle A as a dimming region where radiant intensity of infrared light is lower than radiant intensity of infrared light with which the other regions are irradiated (step S04). The dimming region of the present example means a region where radiant intensity of infrared light is lower than that in the normal region. The control unit 101 supplies a current having a second current value smaller than the first current value to the infrared light source 32, and irradiates the dimming region with infrared light at illuminance lower than illuminance of the normal region.

For example, based on the position information of the right end portion and the left end portion of the other vehicle A acquired from the other-vehicle position acquisition unit 102, the control unit 101 sets a right boundary line 41 of a dimming region Q1 to be leftward of a right end portion 43 of the other vehicle A and sets a left boundary line 42 of the dimming region Q1 to be rightward of a left end portion 44 of the other vehicle A, as shown in FIG. 4. That is, a width W1 of the dimming region Q1 is set to be narrower than a width W2 of the other vehicle A. In addition, the dimming region Q1 is set at a central portion in a vehicle width direction of the other vehicle A. In addition, for example, the control unit 101 may specify a center position 45 in the vehicle width direction of the other vehicle A based on the position information of the right end portion and the left end portion of the other vehicle A acquired from the other-vehicle position acquisition unit 102, set the right boundary line 41 of the dimming region Q1 between the center position 45 and the right end portion of the other vehicle A, and set the left boundary line 42 of the dimming region Q1 between the center position 45 and the left end portion of the other vehicle A.

In addition, for example, the control unit 101 may set a dimming level of the infrared light source 32 according to the distance from the own vehicle 1 to the other vehicle A based on the distance information between the other vehicle A and the own vehicle 1 acquired from the distance acquisition unit 103. Specifically, as the distance from the own vehicle 1 to the other vehicle A becomes closer, the second current value supplied to the infrared light source 32 is reduced and the dimming level of the infrared light source 32 relative to the dimming region Q1 is increased. On the other hand, as the distance from the own vehicle 1 to the other vehicle A becomes farther, the second current value supplied to the infrared light source 32 is increased and the dimming level of the infrared light source 32 relative to the dimming region Q1 is reduced.

The control unit 101 sets a region other than the dimming region Q1 in the irradiable range P1 as a normal region S.

As described above, the vehicle infrared lamp system 100 according to the embodiment is configured such that the dimming region Q1 is formed in the region where the other vehicle whose infrared reflection intensity is high is located. For this reason, it is possible to irradiate the other vehicle present in the irradiable range P1 with infrared light having weak illuminance, and it is possible to weaken intensity of infrared light reflected from the other vehicle. Therefore, it is possible to prevent occurrence of halation caused by the infrared light reflected from the other vehicle in the image captured by the infrared camera 34 of the own vehicle 1. In addition, in the vehicle infrared lamp system 100, the normal region S is set in the region other than the region set as the dimming region Q1, and thus the normal region S is irradiated with infrared light having higher illuminance than the dimming region Q1. For this reason, for example, as shown in FIG. 4, an object having low infrared reflection intensity in the vicinity of the other vehicle, such as a pedestrian B beside the other vehicle A or a pedestrian C behind the other vehicle A, can be easily detected by the infrared camera 34.

Figure 5:
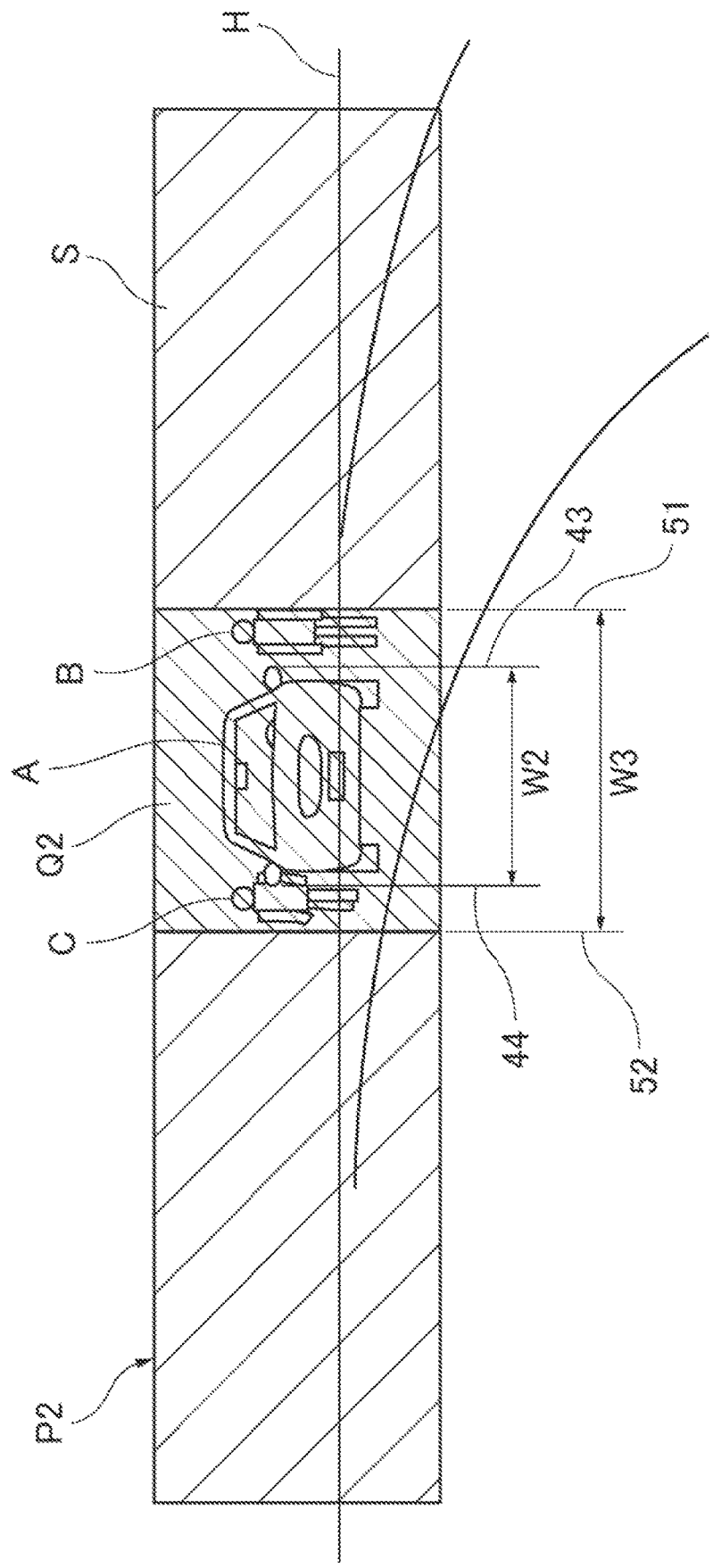
FIG. 5 shows an example of a dimming region formed with a margin in the light distribution pattern with which the other vehicle is irradiated.

Meanwhile, in a vehicle headlamp that irradiates the front of an own vehicle with visible light, it is known that a dimming region where illuminance of the visible light is reduced is set in a range where a position of another vehicle is detected in order to prevent a driver of the other vehicle from being dazzled. FIG. 5 shows an example of a dimming region Q2 set on the other vehicle A in a case where a light source emits visible light. As shown in FIG. 5, in order to prevent a driver of the other vehicle A from being dazzled when the visible light is emitted, a right boundary line 51 of the dimming region Q2 is set to be rightward of the right end portion 43 of the other vehicle A, and a left boundary line 52 is set to be leftward of the left end portion 44 of the other vehicle A. That is, the dimming region Q2 in the case of emitting visible light is set to be a region having a margin relative to the region of the other vehicle A. A width W3 of the dimming region Q2 is set to be wider than the width W2 of the other vehicle A. In this case, although it is possible to prevent the driver of the other vehicle A from being dazzled, it is difficult to acquire information on the region of the other vehicle A and information on the pedestrians B and C in the vicinity of the other vehicle A.

In this regard, in the vehicle infrared lamp system 100, a light source for illuminating a front side is constituted by the infrared light source 32. In addition, as shown in FIG. 4, the dimming region Q1 is formed on an inner side (central portion) in the vehicle width direction of the other vehicle A. Since light of the infrared light source is infrared light, which is different from visible light, the infrared light source does not dazzle the driver of the other vehicle. In addition, when an infrared camera is mounted on a vehicle, the infrared camera is often mounted at a center in a width direction of the vehicle. Therefore, according to this configuration, it is possible to prevent the driver of the other vehicle A from being dazzled, and, when an infrared camera is mounted on the other vehicle A, it can be difficult for glare to be given to the infrared camera. In addition, since the normal region S is set in the region other than the dimming region Q1, the infrared camera 34 of the own vehicle 1 can acquire the information on the left end portion and the right end portion of the other vehicle A excluding the central portion.

In addition, according to the vehicle infrared lamp system 100, the dimming level of the infrared light emitted from the infrared light source 32 to the dimming region Q1 is changed according to the distance from the own vehicle 1 to the other vehicle A. For this reason, it is possible to accurately acquire all information on the other vehicle due to the radiant intensity of the infrared light, which is suitable for the distance to the other vehicle A.

Modification

Figure 6:
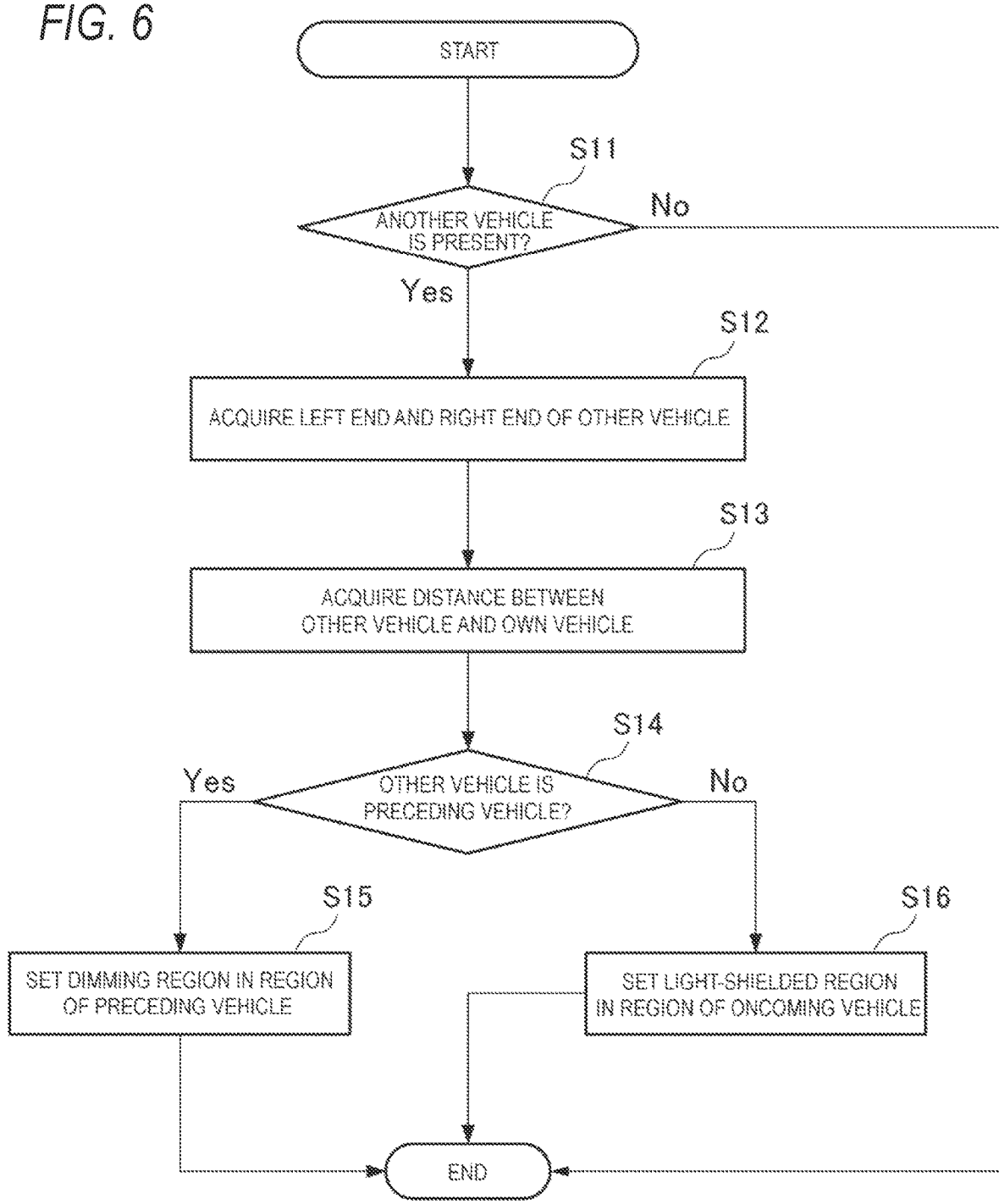
FIG. 6 is a flowchart showing another example of the process executed by the vehicle infrared lamp system.
Figure 7:
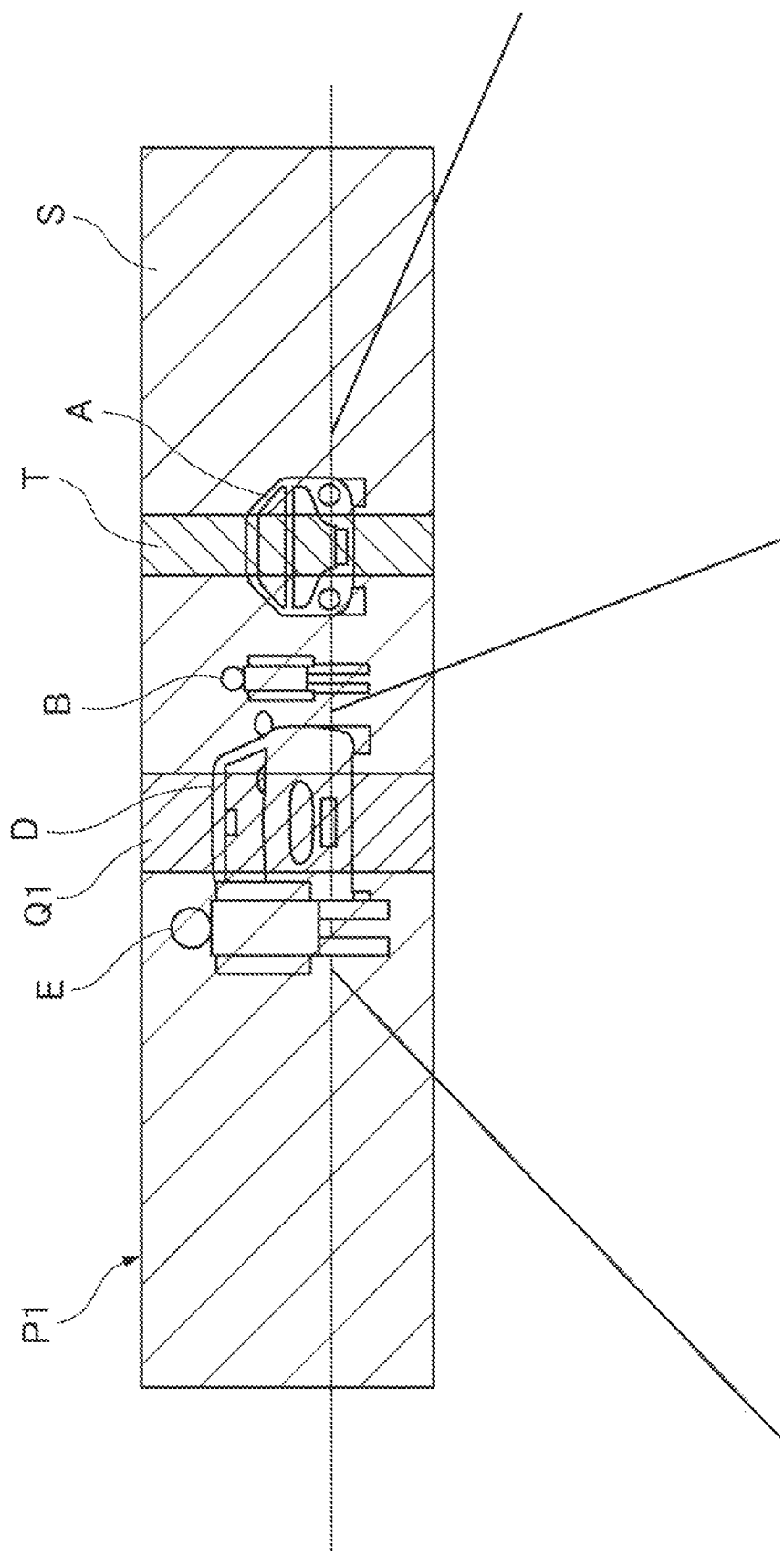
FIG. 7 shows an example of a light distribution pattern with which a preceding vehicle and an oncoming vehicle are irradiated.

Another operation example of the vehicle infrared lamp system 100 will be described with reference to FIGS. 6 and 7. FIG. 6 is a flowchart showing another example of the process executed by the vehicle infrared lamp system 100. FIG. 7 shows an example of a light distribution pattern radiated from the lamp unit 30 of the vehicle 1 toward a preceding vehicle and an oncoming vehicle. In this example, the vehicle infrared lamp system 100 sets a dimming region and a light-shielded region depending on whether the other vehicle is an oncoming vehicle or a preceding vehicle.

The processes up to step S11 in FIG. 6 are the same as the processes up to step S01 in FIG. 3 described above.

In this example, as shown in FIG. 7, it is assumed that an image in which other vehicles A and D are present in front of the own vehicle 1 is captured by the infrared camera 34. Therefore, the control unit 101 detects the other vehicles A and D in step S11.

The other-vehicle position acquisition unit 102 acquires the position information of the left end portion and the position information of the right end portion of the detected other vehicle A and position information of a left end portion and position information of a right end portion of the other vehicle D based on the image captured by the infrared camera 34 (step S12). The acquired position information of the other vehicles A and D is transmitted from the other-vehicle position acquisition unit 102 to the control unit 101.

The distance acquisition unit 103 acquires the distance information between the detected other vehicle A and the own vehicle 1 and distance information between the other vehicle D and the own vehicle 1 based on the image captured by the infrared camera 34 (step S13). The acquired distance information of the other vehicle A and the acquired distance information of the other vehicle D are transmitted from the distance acquisition unit 103 to the control unit 101.

The control unit 101 determines whether the detected other vehicle is a preceding vehicle or an oncoming vehicle (step S14). For example, images captured by two infrared cameras at different imaging timings may be compared with each other, and when a position of the other vehicle greatly changes over a threshold value, or when a region occupied by the other vehicle greatly changes over a threshold value, it may be determined that the other vehicle is an oncoming vehicle, and otherwise, it may be determined that the other vehicle is a preceding vehicle. Alternatively, in a case where the vehicle 1 is equipped with a radar, if time until a reflected wave is detected is shorter than a predetermined value, or if a wavelength of the reflected wave is shorter than a threshold value, it may be determined that the other vehicle is an oncoming vehicle, and otherwise, it may be determined that the other vehicle is a preceding vehicle. In the following description, it is assumed that the other vehicle A is determined to be an oncoming vehicle while the other vehicle D is a preceding vehicle.

When it is determined that the detected other vehicle D is a preceding vehicle (step S14: Yes), the control unit 101 sets at least a partial region of the preceding vehicle D as a dimming region where radiant intensity of infrared light is lower than that in the normal region based on the position information of the preceding vehicle D acquired by the other-vehicle position acquisition unit 102 and the distance information of the preceding vehicle D acquired by the distance acquisition unit 103 (step S15).

On the other hand, when it is determined that the detected other vehicle A is an oncoming vehicle (step S14: No), the control unit 101 sets at least a partial region of the oncoming vehicle A as a light-shielded region that is not irradiated with infrared light based on the position information of the oncoming vehicle A acquired by the other-vehicle position acquisition unit 102 and the distance information of the oncoming vehicle A acquired by the distance acquisition unit 103 (step S16). The control unit 101 sets a current supplied to the infrared light source 32 to zero when the light-shielded region is scanned, and extinguishes the infrared light source 32.

As shown in FIG. 7, similarly to the setting of the dimming region Q1 in step S04 of FIG. 3 described above, the control unit 101 sets the dimming region Q1 on a central portion in the vehicle width direction of the preceding vehicle D, and sets a light-shielded region T on a central portion in the vehicle width direction of the oncoming vehicle A. In addition, similarly to the setting of the dimming level of the infrared light source 32 in step S04 of FIG. 3 described above, the control unit 101 sets the dimming level of the infrared light source 32 according to the distance from the own vehicle 1 to the oncoming vehicle A and the distance from the own vehicle 1 to the preceding vehicle D.

According to such a vehicle infrared lamp system 100, the light-shielded region T is formed on the central portion in the vehicle width direction of the oncoming vehicle A. Therefore, for example, even if an infrared camera is mounted on the oncoming vehicle A, it is possible to prevent glare from being given to the infrared camera. In addition, the dimming region Q1 is formed on the central portion in the vehicle width direction of the preceding vehicle D. Therefore, in a case where an object is present close to the preceding vehicle D, for example, as shown in FIG. 7, even in a case where a pedestrian E is present between the preceding vehicle D and the own vehicle 1 within a range of the dimming region Q1, the infrared camera 34 of the own vehicle 1 can detect the pedestrian E since the preceding vehicle D is irradiated with infrared light with weak illuminance. It should be noted that the preceding vehicle D may be equipped with a rear infrared camera that acquires information of a rear side. Although halation may occur in the rear infrared camera of the preceding vehicle D due to the infrared light radiated on the dimming region Q1, such a rear infrared camera is used at the time of parking or the like, and is not used at the time of traveling. For this reason, even if the preceding vehicle D is irradiated with infrared light from behind during traveling, problems are less likely to occur.

It should be noted that illuminance of the light-shielded region may be lower than illuminance of the dimming region, and the light-shielded region may be irradiated with infrared light.

It should be noted that the present invention is not limited to the above-described embodiments, and modifications, improvements, and the like can be made as appropriate. In addition, materials, shapes, dimensions, numerical values, forms, numbers, arrangement places, and the like of the respective constituent elements in the above-described embodiments are set as desired and are not limited as long as the present invention can be achieved.

Although the optical member that scans the infrared light emitted from the infrared light source 32 by the rotating reflector 33 and transmits the infrared light to the lamp front side through the lens component 35 has been described in the embodiments described above, the present invention is not limited thereto. For example, a portion of the infrared light source 32 and the rotating reflector 33 may be constituted by a multi-array infrared light source, and the optical member may transmit light of the light source to the lamp front side through the lens component 35. The multi-array infrared light source is, for example, a light source having a structure in which a plurality of infrared light sources are arranged in the vertical direction and the horizontal direction. Each of the infrared light sources can emit light in different directions, and a predetermined range on the lamp front side is irradiated by all the infrared light sources. By controlling a lighting state of a specific infrared light source, illuminance of a specific region on the lamp front side is controlled.

In addition, although the infrared camera 34 is provided in the lamp unit 30 (in the lamp) common to the infrared light source 32 in the above-described embodiments, the present invention is not limited thereto. For example, the infrared camera 34 may be provided at another portion of the vehicle 1 instead of being located in the lamp.

In addition, although an example in which the dimming region is irradiated with infrared light having weak illuminance has been described in the above-described embodiment, for example, the dimming region may not be irradiated with infrared light.

Second Embodiment

Next, a vehicle infrared sensor system according to a second embodiment of the present invention will be described.

In recent years, a sensor unit based on a plurality of detection principles, such as a camera or an infrared photodiode, has been mounted on a vehicle. When a plurality of types of sensor units are mounted on the vehicle in this manner, a size of the vehicle is increased.

The second embodiment of the present invention provides a vehicle infrared sensor system capable of emitting light suitable for an infrared camera and an infrared sensor from a common light source.

Figure 8:
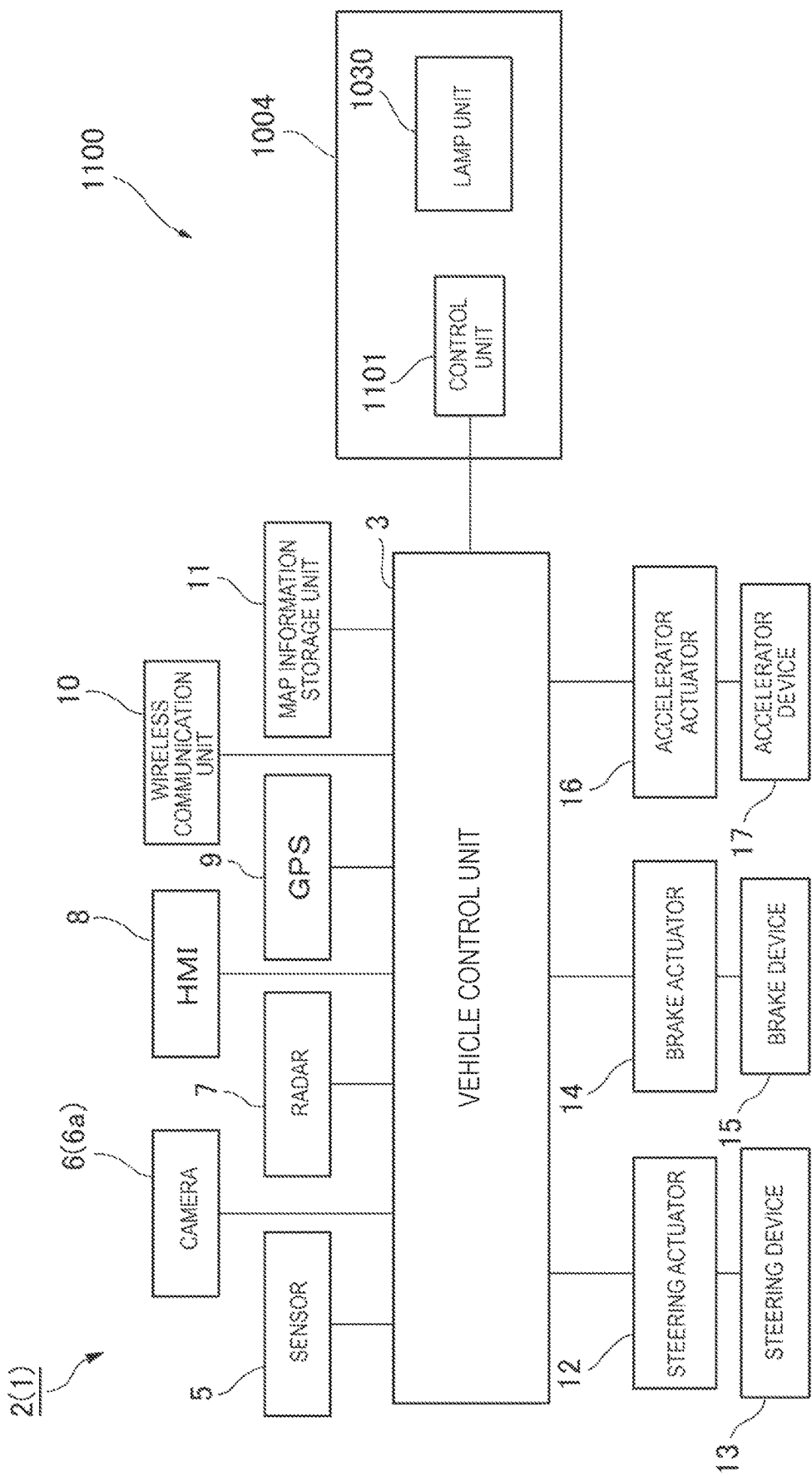
FIG. 8 is a block diagram showing a vehicle system in which a vehicle infrared sensor system according to a second embodiment of the present invention is incorporated.

FIG. 8 is a block diagram showing the vehicle system 2 in which a vehicle infrared sensor system 1100 according to the second embodiment of the present invention is incorporated.

The vehicle 1 on which the vehicle system 2 is mounted is a vehicle (automobile) that can travel in the automatic driving mode as in the first embodiment described above. As shown in FIG. 8, the vehicle system 2 includes the vehicle control unit 3, the sensor 5, the camera 6, the radar 7, the human machine interface (HMI) 8, the global positioning system (GPS) 9, the wireless communication unit 10, and the map information storage unit 11. The vehicle system 2 also includes the steering actuator 12, the steering device 13, the brake actuator 14, the brake device 15, the accelerator actuator 16, and the accelerator device 17. Further, the vehicle system 2 includes the vehicle infrared sensor system 1100. Since such components are the same as those of the first embodiment shown in FIG. 1, such components are denoted by the same reference numerals, and a detailed description thereof will be omitted.

The camera (in-vehicle camera) 6 is, for example, a camera including an imaging element such as a charge-coupled device (CCD) or a complementary MOS (CMOS). Imaging of the camera 6 is controlled based on a signal transmitted from the vehicle control unit 3. The camera 6 can generate an image based on received visible light. The camera 6 includes an infrared camera 6a that detects infrared light. The infrared camera 6a can generate an image based on received infrared light.

The vehicle infrared sensor system 1100 includes a vehicle lamp 1004 (for example, a headlamp) on which a lamp unit 1030 and a control unit 1101 are mounted. The control unit 1101 controls an operation of the vehicle lamp 1004. The control unit 1101 is communicably connected to the vehicle control unit 3. The vehicle lamp 1004 is mounted on the front portion of the vehicle 1.

Figure 9:
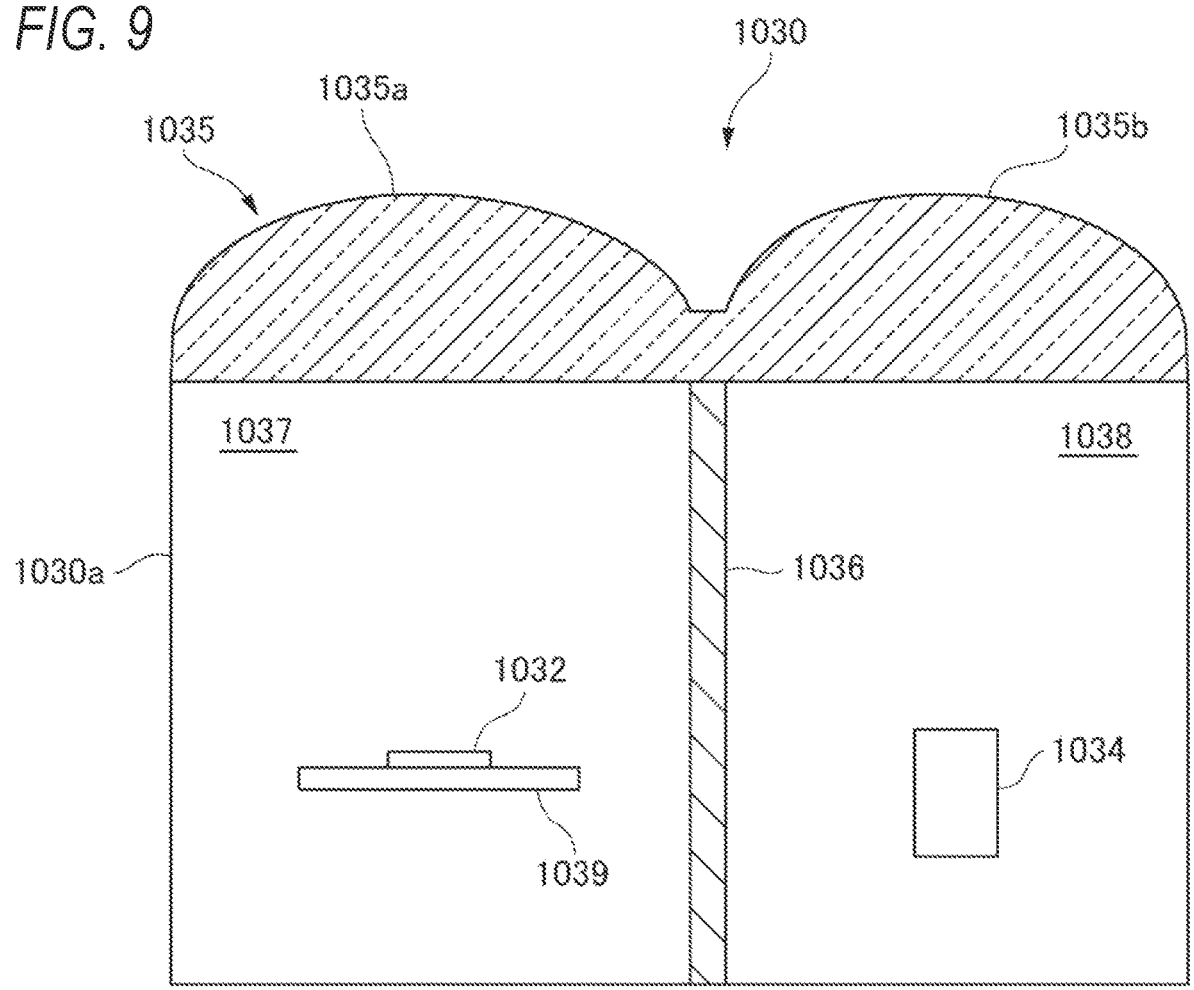
FIG. 9 is a schematic view showing an internal configuration of a lamp unit mounted on a vehicle lamp.

FIG. 9 is a schematic view showing an internal configuration of the lamp unit 1030 mounted on the vehicle lamp 1004. As shown in FIG. 9, the lamp unit 1030 includes a housing 1030a, an infrared light source 1032, an infrared sensor 1034, a lens component 1035, and a light shielding wall 1036.

An inside of the housing 1030a is partitioned by the light shielding wall 1036 into two spaces, namely a first lamp chamber 1037 and a second lamp chamber 1038. The infrared light source 1032 is provided in the first lamp chamber 1037. The infrared sensor 1034 is provided in the second lamp chamber 1038.

The infrared light source 1032 is constituted by a plurality of light emitting diodes (LED) that emit infrared light. The infrared light source 1032 is mounted on a board 1039. On and off of the infrared light source 1032 mounted on the board 1039 is controlled by the control unit 1101. The infrared light source 1032 is controlled to be driven in, for example, an on-off state for an imaging mode (first mode) suitable for imaging by the infrared camera 6a and an on-off state for a sensing mode (second mode) suitable for sensing by the infrared sensor 1034.

The infrared sensor 1034 is constituted by a photodiode (PD) that detects infrared light. The infrared sensor 1034 outputs a signal corresponding to intensity of received infrared light. The infrared sensor 1034 outputs a signal having higher signal intensity as the intensity of the received infrared light becomes higher. The infrared sensor 1034 has the highest light receiving sensitivity at a peak wavelength of the infrared light emitted from the infrared light source 1032. The infrared sensor 1034 is configured to receive reflected light of the infrared light emitted from the infrared light source 1032 toward the lamp front side and detect a peak wavelength of the reflected light. Information on the reflected light acquired by the infrared sensor 1034 is transmitted to the control unit 1101. An operation of the infrared sensor 1034, for example, a sensing operation of detecting infrared light, is controlled based on a signal transmitted from the control unit 1101.

The infrared camera 6a is a camera having highest sensitivity to the peak wavelength of the infrared light emitted from the infrared light source 1032. The infrared camera 6a can acquire an image corresponding to the reflected light of the infrared light emitted from the infrared light source 1032 to the lamp front side. The image acquired by the infrared camera 6a is transmitted to the control unit 1101. An operation of the infrared camera, for example, an imaging operation of imaging the front of the vehicle 1 may be controlled based on a signal transmitted from the vehicle control unit 3, or may be controlled based on a signal transmitted from the control unit 1101.

The lens component 1035 is provided at a front portion of the housing 1030a. The lens component 1035 includes a projection lens 1035a (an example of an optical member) and a condenser lens 1035b. The projection lens 1035a is disposed at a front portion in the first lamp chamber 1037. Light emitted from the infrared light source 1032 is incident on the projection lens 1035a. The projection lens 1035a transmits the incident light of the infrared light source 1032 to the lamp front side. The infrared light source 1032 is disposed in the vicinity of a focal point of the projection lens 1035a. The condenser lens 1035b is disposed at a front portion in the second lamp chamber 1038. The condenser lens 1035b collects light from the lamp front side, for example, reflected light that is emitted from the infrared light source 1032 and reflected by a detected object such as another vehicle, and guides the collected light to the infrared sensor 1034. A light receiving surface of the infrared sensor 1034 is disposed in the vicinity of a focal point of the condenser lens 1035b. A distance between the projection lens 1035a and a rear focal point thereof is shorter than a distance between the condenser lens 1035b and a rear focal point thereof. The projection lens 1035a and the condenser lens 1035b are integrally formed as the single lens component 1035.

The light shielding wall 1036 is provided between an optical axis of the projection lens 1035a and an optical axis of the condenser lens 1035b. For example, the light shielding wall 1036 is provided at a position where the light shielding wall 1036 shields light that is emitted from the infrared light source 1032 and is about to be incident directly on the infrared sensor 1034 without being incident on the projection lens 1035a.

Figure 10:
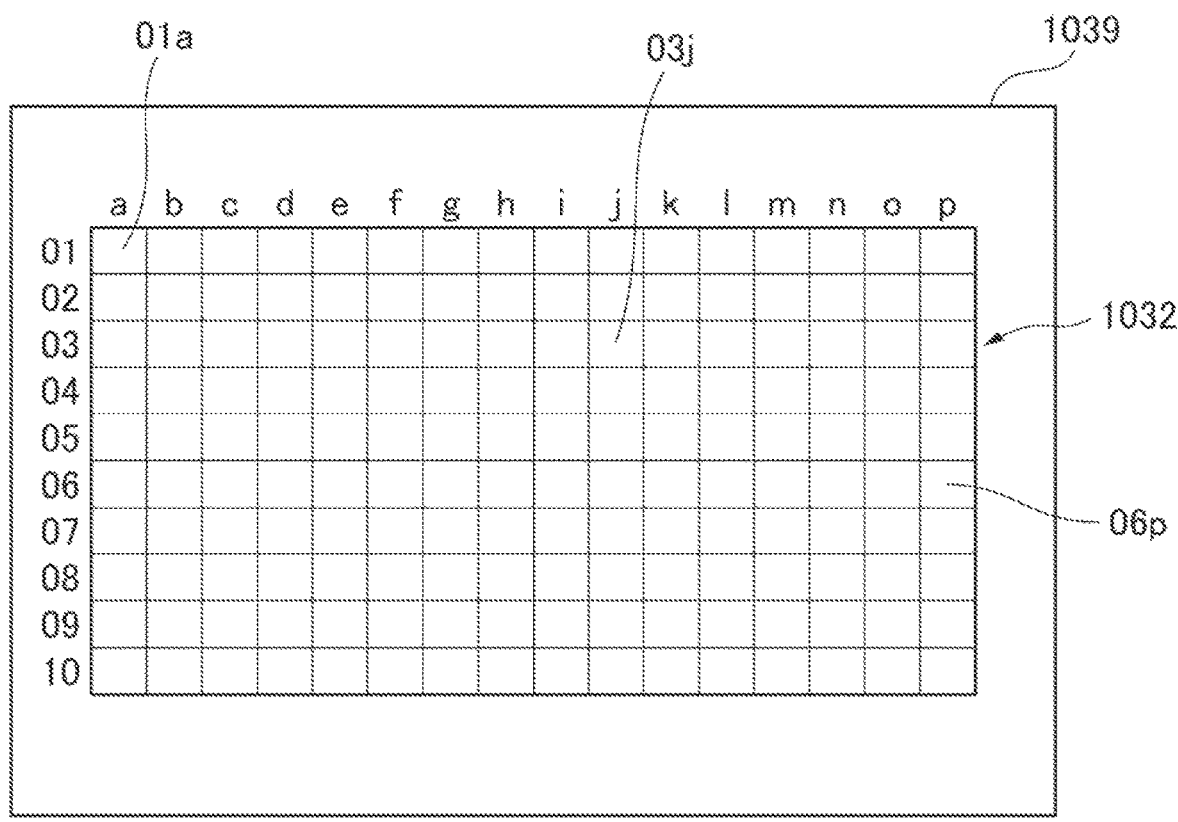
FIG. 10 is a front view of an infrared light source mounted on the lamp unit.

FIG. 10 is a front view of the infrared light source 1032. As shown in FIG. 10, the infrared light source 1032 includes a plurality of infrared LEDs two-dimensionally arrayed in an up-down direction (01 to 10) and a left-right direction (a to p). In the following description, the infrared light source 1032 located at an n-th (n is any one of 01 to 10) position from the top and at an x-th (x is any one of a to p) position from the left in FIG. 10 is referred to as an infrared LEDnx. For example, an infrared LED 03j is an infrared LED located at a 03-th position from the top and a j-th position from the left in FIG. 10.

Infrared LEDs 01a to 10p can emit light in different directions. The infrared light source 1032 is controlled by the control unit 1101, and illuminance of a specific region on the lamp front side is controlled by controlling an on-off state of a specific infrared LED.

In the present embodiment, the control unit 1101 drives the infrared light source 1032 in the imaging mode (first mode) suitable for imaging with the infrared camera and the sensing mode (second mode) suitable for sensing with the infrared sensor. Hereinafter, the imaging mode and the sensing mode will be described with reference to FIGS. 11 to 13.

Figure 11:
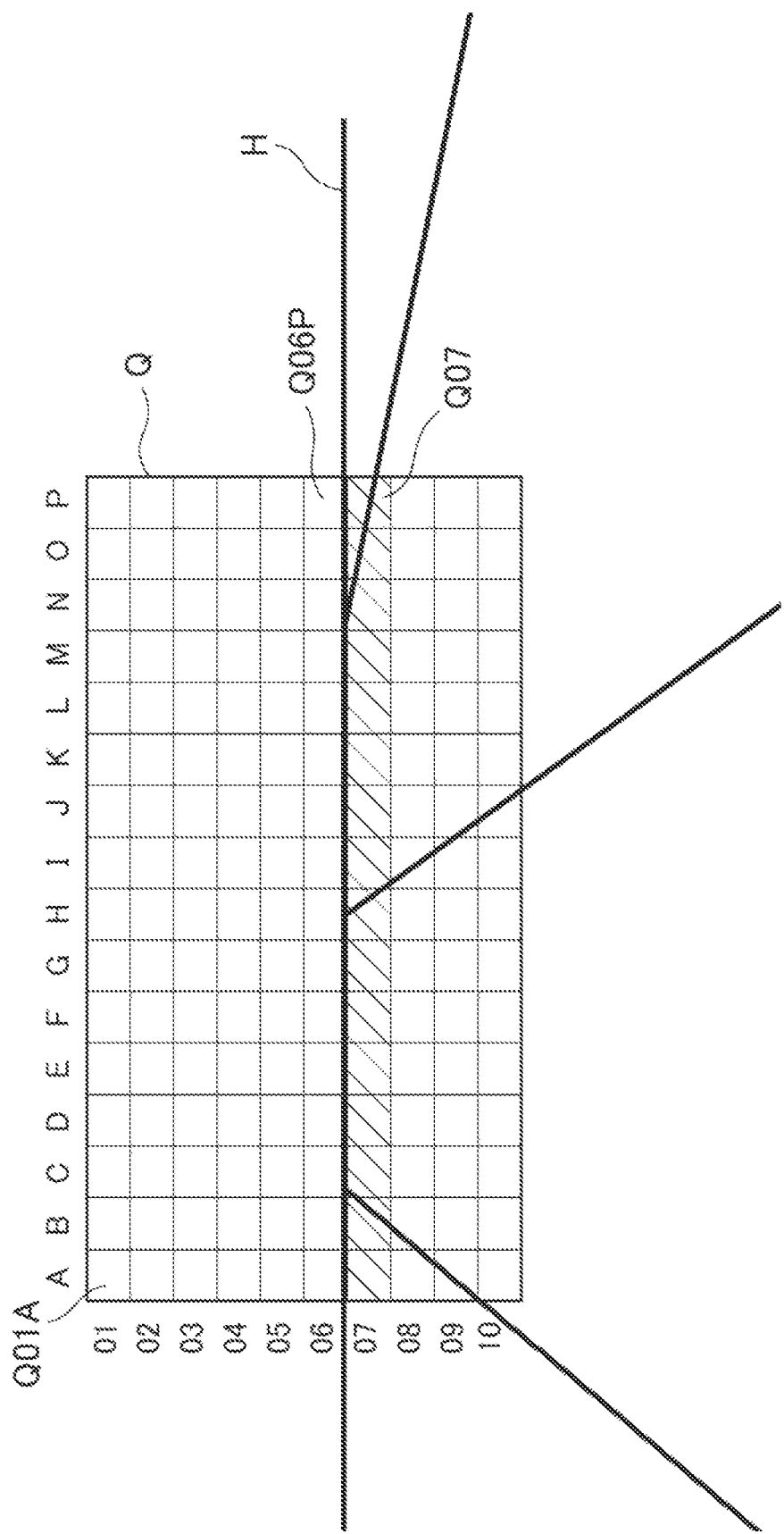
FIG. 11 is a schematic view showing a range that can be irradiated with infrared light of the lamp unit.

FIG. 11 is a schematic view showing an irradiable range Q of the lamp unit 1030. The irradiable range Q in FIG. 11 is displayed on a virtual vertical screen when the vertical screen is arranged to be 25 m ahead of the vehicle lamp 1004, for example. The irradiable range Q is a maximum range that can be irradiated by the lamp unit 1030 with infrared light, and is irradiated by lighting all the infrared LEDs 01a to 10p of the infrared light source 1032.

In FIG. 11, for convenience of description, the irradiable range Q is divided into 10 regions in the vertical direction and 11 regions in the horizontal direction. In the irradiable range Q of FIG. 11, a region specified by an N-th region (N is any one of 01 to 10) from the top in the vertical direction and an X-th region (X is any one of A to P) from the left in the horizontal direction is referred to as a region QNX. For example, when the infrared LED 01a located at an upper left end in FIG. 10 is lighted, a region Q01A located at an upper left end in FIG. 11 is irradiated with infrared light. Alternatively, when the infrared LED 06p is lighted, a region Q06P in FIG. 11 is irradiated with light. In the vehicle infrared sensor system 1100, which one of regions Q01A to Q10P is irradiated with infrared light when each of the infrared LEDs 01a to 10p is lighted is recorded in a memory, and the control unit 1101 can read out related information from the memory.

In addition, in the following description, an entire region in the horizontal direction in an N-th row from the top in the vertical direction is referred to as a region QN. The region QN is a band-shaped region extending in the left-right direction. For example, A-th to P-th regions in the horizontal direction in a seventh row from the top in the vertical direction is referred to as a region Q07. When the infrared LEDs 07a to 07p in FIG. 10 are lighted, the region Q07 is irradiated with infrared light. In the present embodiment, the irradiable range Q is divided such that a line H is located between a region Q06 and the region Q07.

Figure 12:
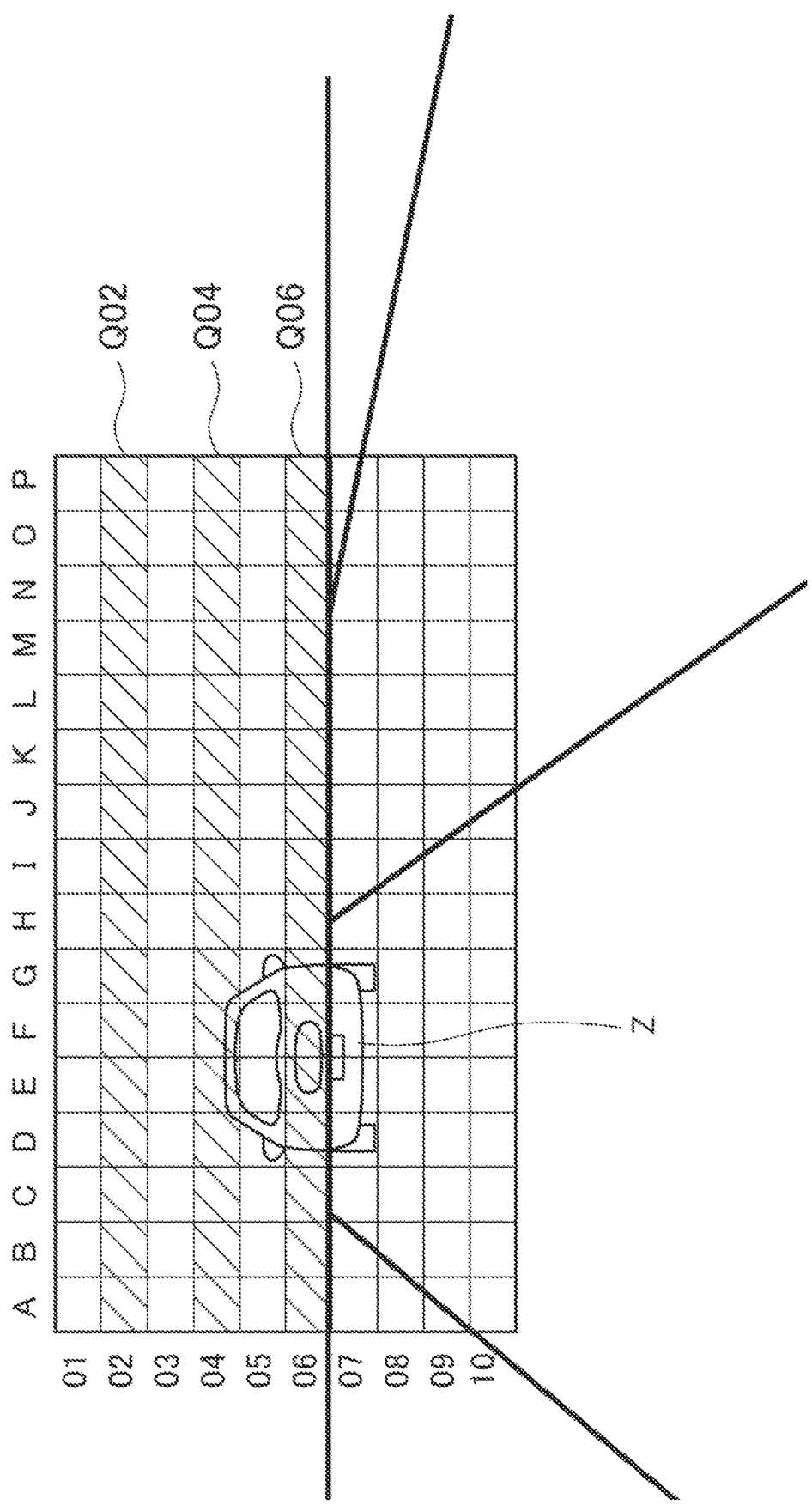
FIG. 12 is a schematic view showing an example of a light distribution pattern in a sensing mode.

FIG. 12 is a schematic view showing an irradiation pattern radiated when the control unit 1101 drives the infrared light source 1032 in the sensing mode. As shown in FIG. 12, as the sensing mode in the present example, the control unit 1101 controls the infrared light source 1032 such that a region Q02, a region Q04, and the region Q06 are irradiated in order to sense a detected object such as another vehicle.

In the sensing mode, the control unit 1101 lights only one infrared LED at each moment and sequentially changes the infrared LED to be lighted, thereby sensing whether an object such as another vehicle is present within the irradiable range Q. The control unit 1101 detects presence or absence of reflected light of infrared light from any direction by the infrared sensor 1034, and specifies presence or absence and a position of an object on the lamp front side. For example, when the infrared sensor 1034 detects reflected light having intensity equal to or higher than a predetermined value from a certain direction, the control unit 1101 determines that another vehicle is present in this direction.

For example, in the region Q02, the control unit 1101 lights only one infrared LED at each moment and sequentially changes the infrared LED to be lighted so as to scan the region Q02 extending in the left-right direction. Specifically, the control unit 1101 scans the band-shaped region Q02 by sequentially lighting and extinguishing the infrared LEDs 02a to 10p.

When the scanning of the region Q02 is completed, the region Q04 and the region Q06 are sequentially scanned. Although the regions Q02, Q04, and Q06 are irradiated as the sensing mode in this example, an irradiation range in the sensing mode is not limited thereto.

As shown in FIG. 12, in a case where another vehicle Z is present in front of the own vehicle, the infrared sensor 1034 detects reflected light having strong intensity when the regions Q04D to Q04G and Q06D to Q06G are irradiated with infrared light. That is, when the control unit 1101 lights the infrared LEDs 04d to 04g and 06d to 06g, a signal equal to or higher than a predetermined value is output from the infrared sensor 1034. Therefore, the control unit 1101 determines that the other vehicle is located in the regions Q04D to Q04G and Q06D to Q06G, and the other vehicle is not present in the other regions.

Figure 13:
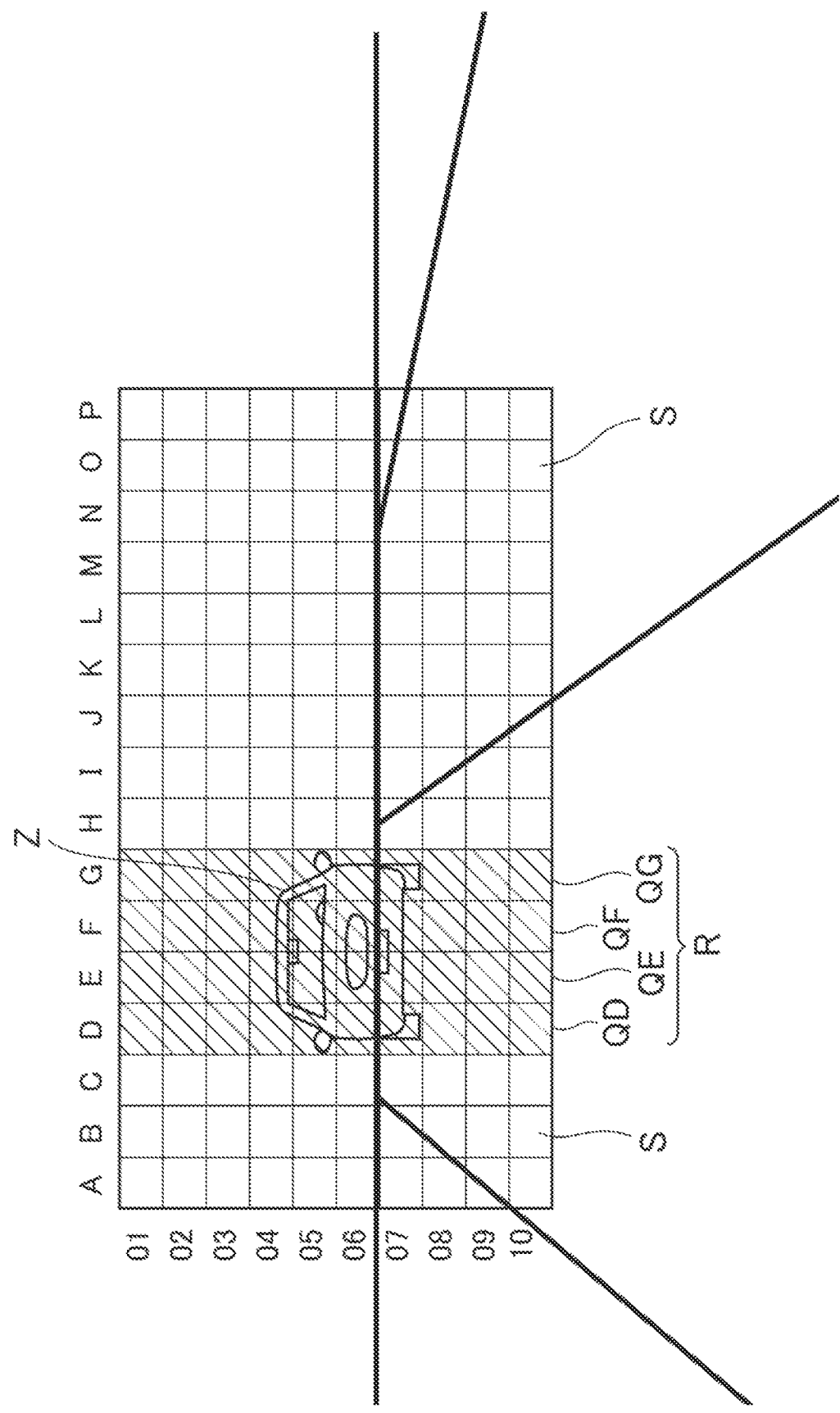
FIG. 13 is a schematic view showing an example of a light distribution pattern in an imaging mode.

FIG. 13 is a schematic view showing an irradiation pattern radiated when the control unit 1101 drives the infrared light source 1032 in the imaging mode. In FIG. 13, the control unit 1101 forms a light distribution pattern including a normal region and a dimming region. In the imaging mode, unlike the sensing mode, the control unit 1101 simultaneously lights the plurality of infrared LEDs 01a to 10p.

In the imaging mode, the control unit 1101 sets a normal region S in a region where the other vehicle Z is not present, and sets a dimming region R in a region where the other vehicle Z is present. In the shown example, all of regions QD, QE, QF, and QG in the vertical direction including the regions Q04D to Q04G and Q06D to Q06G where the other vehicle Z is present are set as the dimming region R, and the other regions are set as the normal region S.

The control unit 1101 supplies a current having a first current value to the infrared LED that emits infrared light toward the normal region S, and supplies a current having a second current value lower than the first current value to the infrared LED that emits infrared light toward the dimming region R. That is, the control unit 1101 irradiates the dimming region R with infrared light such that illuminance thereof is lower than illuminance of the normal region S.

In this way, in the present embodiment, the control unit 1101 sets the dimming region R where radiant intensity of infrared light is lower than that of the other region S when the infrared light source 1032 is driven in the imaging mode in accordance with output of the infrared sensor 1034 obtained when infrared light is radiated in the sensing mode. As a result, when the infrared camera 6a captures an image of the front of the vehicle, it is possible to prevent large difference between intensity of reflected light of infrared light from the other vehicle Z whose reflection intensity is high and intensity of reflected light of infrared light from the other regions, and thus it is possible to prevent occurrence of halation in the image acquired by the infrared camera 6a.

The vehicle infrared sensor system 1100 according to the present embodiment is configured such that the driving of the infrared light source 1032 is switched between the imaging mode suitable for imaging by the infrared camera 6a and the sensing mode suitable for sensing by the infrared sensor 1034. Therefore, light for the infrared camera 6a and light for the infrared sensor 1034 can be emitted by the common infrared light source 1032. Therefore, the number of components constituting the vehicle infrared sensor system 1100 can be reduced, and thus an increase in the size of the vehicle 1 can be prevented.

Further, the control unit 1101 sets the dimming region R where the radiant intensity of the infrared light is lower than that of the other region S when driving in the imaging mode in accordance with the output of the infrared sensor 1034. For this reason, when the infrared camera 6a captures an image of the front of the vehicle, it is possible to prevent large difference between intensity of reflected light of infrared light from an object having high reflection intensity (the other vehicle Z or the like) and the intensity of the reflected light of the infrared light from the other region, and thus it is possible to prevent the occurrence of halation in the image acquired by the infrared camera 6a.

In addition, according to the vehicle infrared sensor system 1100, the infrared light source 1032 is constituted by the multi-array light source in which the plurality of infrared LEDs are two-dimensionally arrayed. Therefore, it is possible to accurately and easily control illuminance of a specific region in the irradiable range Q. In addition, the light for the infrared camera 6a and the light for the infrared sensor 1034 can be emitted with a simple configuration.

In addition, according to the vehicle infrared sensor system 1100, the infrared light source 1032 is disposed in the vicinity of the focal point of the projection lens 1035a, and the infrared sensor 1034 is disposed in the vicinity of the focal point of the condenser lens 1035b. Therefore, light of the infrared light source 1032 can be accurately emitted in any direction as desired, and thus detection accuracy of the infrared sensor 1034 can be improved. Further, since the projection lens 1035a and the condenser lens 1035b are integrated with each other, it is possible to prevent an increase in the number of components.

In addition, according to the vehicle infrared sensor system 1100, the light shielding wall 1036 that prevents the light emitted from the infrared light source 1032 from being directly incident on the infrared sensor 1034 is provided. Therefore, at the time of light detection performed by the infrared sensor 1034, the light from the infrared light source 1032 can be prevented from being directly incident on the infrared sensor 1034, and thus the detection accuracy of the infrared sensor 1034 can be improved.

In addition, according to the vehicle infrared sensor system 1100, in the imaging mode, the infrared LEDs 01a to 10p are simultaneously lighted to irradiate all regions within an angle of view of the infrared camera 6a with infrared light. In addition, in the sensing mode, only one infrared LED is lighted at each moment, and the infrared LED to be lighted is sequentially changed so as to detect presence or absence of reflected infrared light from any direction, thereby detecting presence or absence and a position of an object on the lamp front side. Therefore, imaging accuracy of the infrared camera 6a can be improved in the imaging mode, and the detection accuracy of the infrared sensor 1034 can be improved in the sensing mode.

Figure 14:
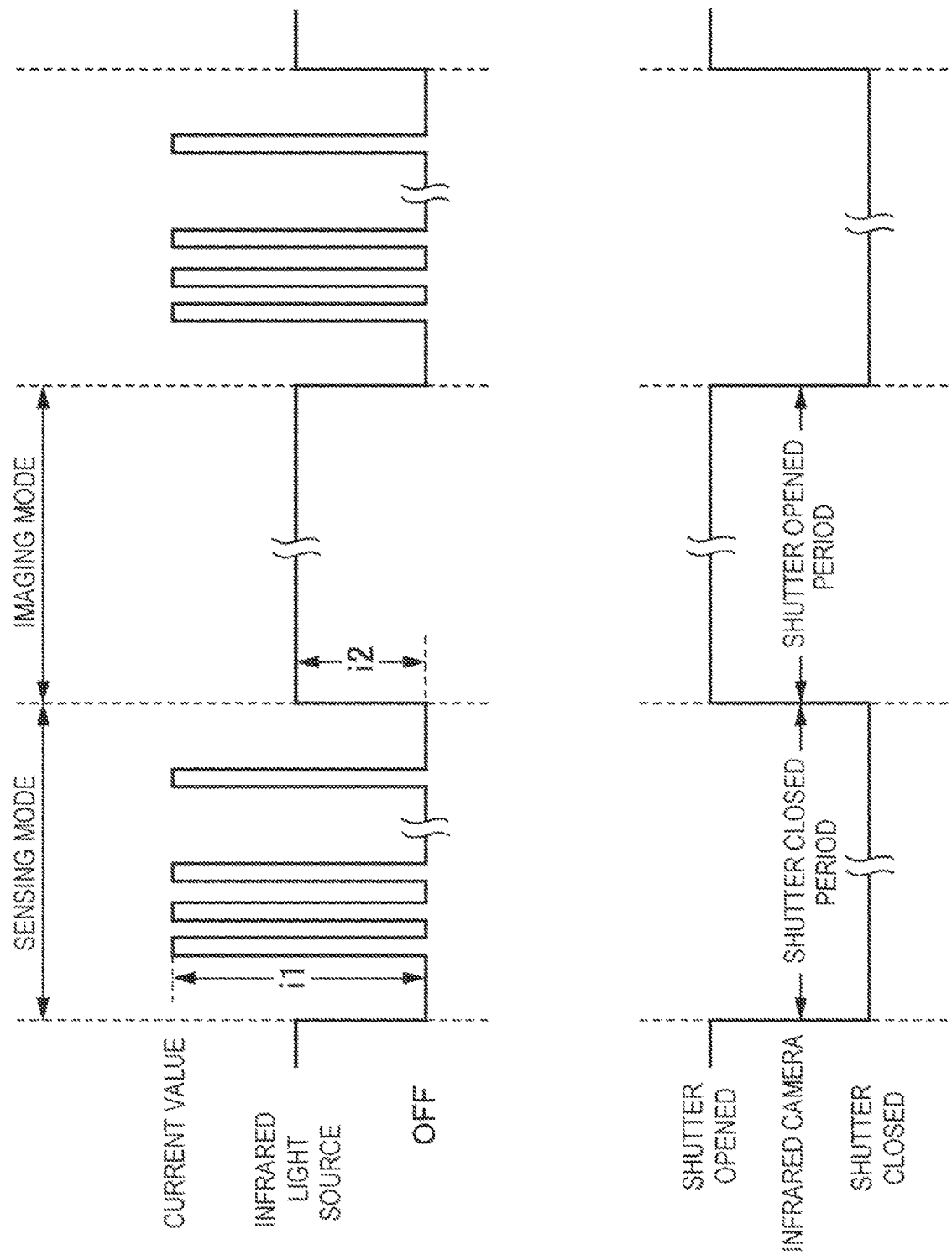
FIG. 14 is a time chart showing a lighting timing of the infrared light source and an exposure timing of an infrared camera.

Next, a lighting timing of the infrared light source 1032 and an exposure timing of the infrared camera 6a will be described in detail. FIG. 14 is a time chart showing the lighting timing of the infrared light source 1032 and the exposure timing of the infrared camera 6a.

As shown in FIG. 14, the control unit 1101 drives the infrared light source 1032 to repeat the imaging mode and the sensing mode. In addition, the control unit 1101 switches between the imaging mode and the sensing mode in conjunction with a shutter opened period, which is the exposure timing of the infrared camera 6a, and a shutter closed period. That is, the control unit 1101 sets the infrared camera 6a to the shutter closed period when driving the infrared light source 1032 in the sensing mode, and sets the infrared camera 6a to the shutter opened period when driving the infrared light source 1032 in the imaging mode.

In the sensing mode, the control unit 1101 lights one infrared LED at each moment and extinguishes the other infrared LEDs. At a next moment, the next infrared LED is lighted and the other infrared LEDs are extinguished. By sequentially lighting and extinguishing the infrared LEDs in this manner, the irradiable range Q is scanned.

In this way, when the control unit 1101 drives the infrared light source 1032 in the sensing mode, the infrared camera 6a is set to the shutter closed period, and the infrared sensor 1034 is operated. As described above, the normal region S and the dimming region R are set in accordance with the output of the infrared sensor 1034.

In the imaging mode, the control unit 1101 supplies the current having the first current value or the second current value to all the infrared LEDs so as to cause the infrared LEDs to emit light. As a result, the front of the vehicle is illuminated with infrared light at brightness suitable for imaging by the infrared camera 6a. When the control unit 1101 drives the infrared light source 1032 in the imaging mode, the infrared camera 6a is set to the shutter opened period. At this time, the control unit 1101 may set the infrared sensor 1034 to a non-operating state.

In the sensing mode and the imaging mode, the control unit 1101 performs pulse width modulation (PWM) control on the infrared LEDs 01a to 10p. The control unit 1101 performs control such that a duty of a current supplied to the infrared LEDs 01a to 10p in the imaging mode is larger than a duty of a current supplied to the infrared LEDs 01a to 10p in the sensing mode. In addition, the control unit 1101 performs control such that an instantaneous current value i2 supplied to the infrared LEDs 01a to 10p in the imaging mode is smaller than an instantaneous current value i1 supplied to the infrared LEDs 01a to 10p in the sensing mode.

Control of the infrared LEDs 01a to 10p in the imaging mode and control of the infrared LEDs 01a to 10p in the sensing mode may be controlled to have difference in, for example, an energization time of a pulse input to the infrared LEDs 01a to 10p or a non-energization time of the pulse input to the infrared LEDs 01a to 10p. In addition, the control of the infrared LEDs 01a to 10p in the imaging mode and the control of the infrared LEDs 01a to 10p in the sensing mode may be controlled to have difference in, for example, an input current to be input to the infrared LEDs 01a to 10p. When the dimming region is set in the imaging mode according to a sensing result of the infrared sensor 1034, the control unit 1101 changes at least one of the energization time of the pulse input to the infrared LEDs 01a to 10p, the non-energization time of the pulse, and the input current, for example.

In addition, for example, when a pulse current is input to the infrared LEDs 01a to 10p, the control unit 1101 lights and extinguishes one infrared LED at each moment as described above and sequentially changes the infrared LED to be lighted and extinguished in the sensing mode. Therefore, energization timings of pulse currents input to the respective infrared LEDs 01a to 10p are controlled so as not to overlap with each other.

In this way, the vehicle infrared sensor system 1100 according to the present embodiment is configured such that the switching between the imaging mode and the sensing mode is in conjunction with the exposure timing of the infrared camera 6a. For this reason, the infrared camera 6a is not irradiated with infrared light having strong intensity for sensing at the time of imaging, and thus a clear image is more easily obtained by the infrared camera 6a.

In addition, according to the vehicle infrared sensor system 1100, the duty of the current supplied in the imaging mode is configured to be larger than the duty of the current supplied in the sensing mode. Therefore, it is possible to obtain strongly reflected infrared light in the sensing mode, and thus the detection accuracy of the infrared sensor 1034 is easily improved.

In addition, according to the vehicle infrared sensor system 1100, the instantaneous current value supplied in the imaging mode is configured to be smaller than the instantaneous current value supplied in the sensing mode. At the time of imaging by the infrared camera 6a, it is preferable that light with appropriate illuminance is irradiated in a wide range rather than locally radiating infrared light with strong illuminance. On the other hand, at the time of sensing by the infrared sensor 1034, it is preferable that a specific region is irradiated with infrared light with strong illuminance. According to the present embodiment, light distribution patterns suitable for such two situations that require different characteristics are obtained by the single infrared light source 1032.

In addition, according to the vehicle infrared sensor system 1100, when the imaging mode and the sensing mode are switched according to the output of the infrared sensor 1034, at least one of the energization time, the non-energization time, and the input current of the pulse input to the infrared light source 1032 is changed.

In addition, according to the vehicle infrared sensor system 1100, in the sensing mode, the energization timings of the pulse currents input to the respective infrared LEDs 01a to 10p do not overlap each other. Therefore, it is possible to improve the detection accuracy of the infrared sensor 1034 that detects reflected light of infrared light emitted from each of the infrared LEDs 01a to 10p.

It should be noted that the present invention is not limited to the above-described embodiments, and modifications, improvements, and the like can be made as appropriate. In addition, materials, shapes, dimensions, numerical values, forms, numbers, arrangement places, and the like of the respective constituent elements in the above-described embodiments are set as desired and are not limited as long as the present invention can be achieved.

Although an example in which the infrared light source 1032 and the infrared sensor 1034 are mounted in the vehicle lamp 1004 is shown in the above embodiment, the present invention is not limited thereto. For example, the infrared camera 6a may be mounted in the vehicle lamp 1004 together with the infrared light source 1032 and the infrared sensor 1034. In addition, a configuration in which only the infrared light source 1032 among the infrared light source 1032, the infrared sensor 1034, and the infrared camera is mounted in the vehicle lamp 1004 may be adopted.

In addition, although the infrared light source 1032 is constituted by the LED that emits infrared light in the above-described embodiment, the infrared light source 1032 may also be configured to include, for example, a laser diode (LD) that emits infrared light. In a case where the infrared light source 1032 is required to irradiate a wide range, it is preferable to use an LED whose emitted light has a large degree of diffusion. In a case where the infrared light source 1032 is required to perform sensing of another vehicle or the like, it is preferable to use an LD whose emitted light has a small degree of diffusion. Therefore, the infrared light source 1032 may be configured such that, for example, an LED or an LD is mounted for each row in the left-right direction.

Third Embodiment

In recent years, various sensors such as night vision devices are required to be mounted on a vehicle, and thus the vehicle tends to have increased size and weight.

A third embodiment of the present invention provides a vehicle infrared-sensor-equipped lamp including an infrared sensor, which is less likely to cause the increase in size and weight of the vehicle.

Figure 15:
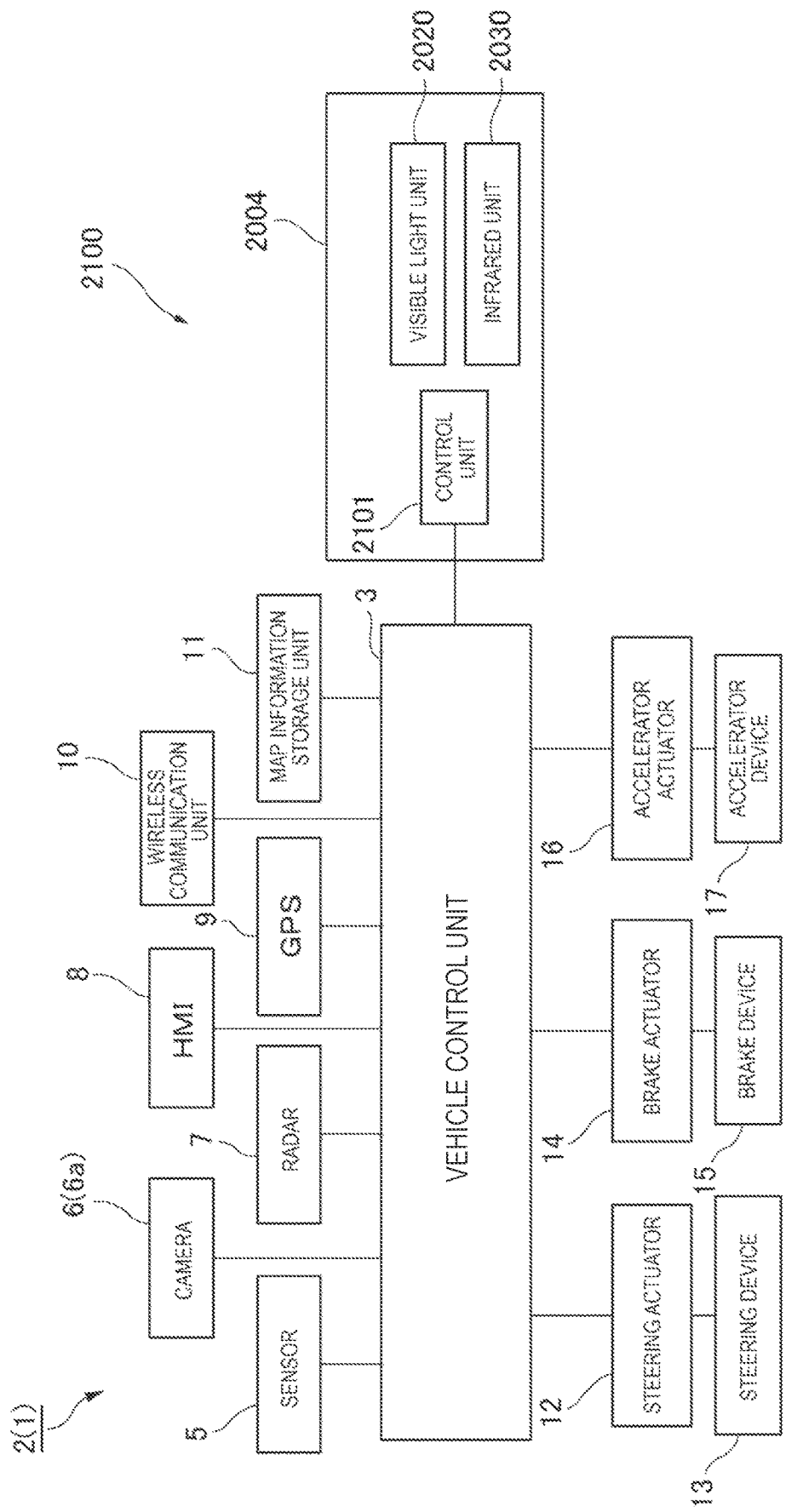
FIG. 15 is a block diagram showing a vehicle system in which a vehicle infrared-sensor-equipped lamp according to a third embodiment of the present invention is incorporated.

FIG. 15 is a block diagram showing the vehicle system 2 in which a vehicle infrared-sensor-equipped lamp 2004 according to the third embodiment of the present invention is incorporated. The vehicle 1 on which the vehicle system 2 is mounted is a vehicle (automobile) that can travel in an automatic driving mode. As shown in FIG. 15, the vehicle system 2 includes the vehicle control unit 3, the vehicle infrared-sensor-equipped lamp 2004, the sensor 5, the camera 6, the radar 7, the human machine interface (HMI) 8, the global positioning system (GPS) 9, the wireless communication unit 10, and the map information storage unit 11. The vehicle system 2 further includes the steering actuator 12, the steering device 13, the brake actuator 14, the brake device 15, the accelerator actuator 16, and the accelerator device 17.

The vehicle infrared-sensor-equipped lamp 2004 includes a visible light unit 2020, an infrared unit 2030, and a control unit 2101. The vehicle infrared-sensor-equipped lamp 2004 is a lamp (for example, a headlamp or the like) mounted on the front portion of the vehicle 1. The visible light unit 2020 is a unit capable of emitting visible light. The infrared unit 2030 is a unit capable of emitting infrared light. The control unit 2101 is communicably connected to the vehicle control unit 3. When a predetermined condition is satisfied, the vehicle control unit 3 generates an instruction signal for controlling lighting and extinguishing of the vehicle infrared-sensor-equipped lamp 2004, and transmits the instruction signal to the control unit 2101. The control unit 2101 controls operations of the visible light unit 2020, the infrared light unit 2030, and the like based on the received instruction signal. Information acquired by the control unit 2101 and information acquired by the vehicle control unit 3 are transmitted and received between each other.

The camera (in-vehicle camera) 6 is, for example, a camera including an imaging element such as a charge-coupled device (CCD) or a complementary MOS (CMOS). Imaging of the camera 6 is controlled based on a signal transmitted from the vehicle control unit 3. The camera 6 can generate an image based on received visible light. The camera 6 may also be an infrared camera that detects infrared light. The infrared camera can generate an image based on received infrared light.

Figure 16:
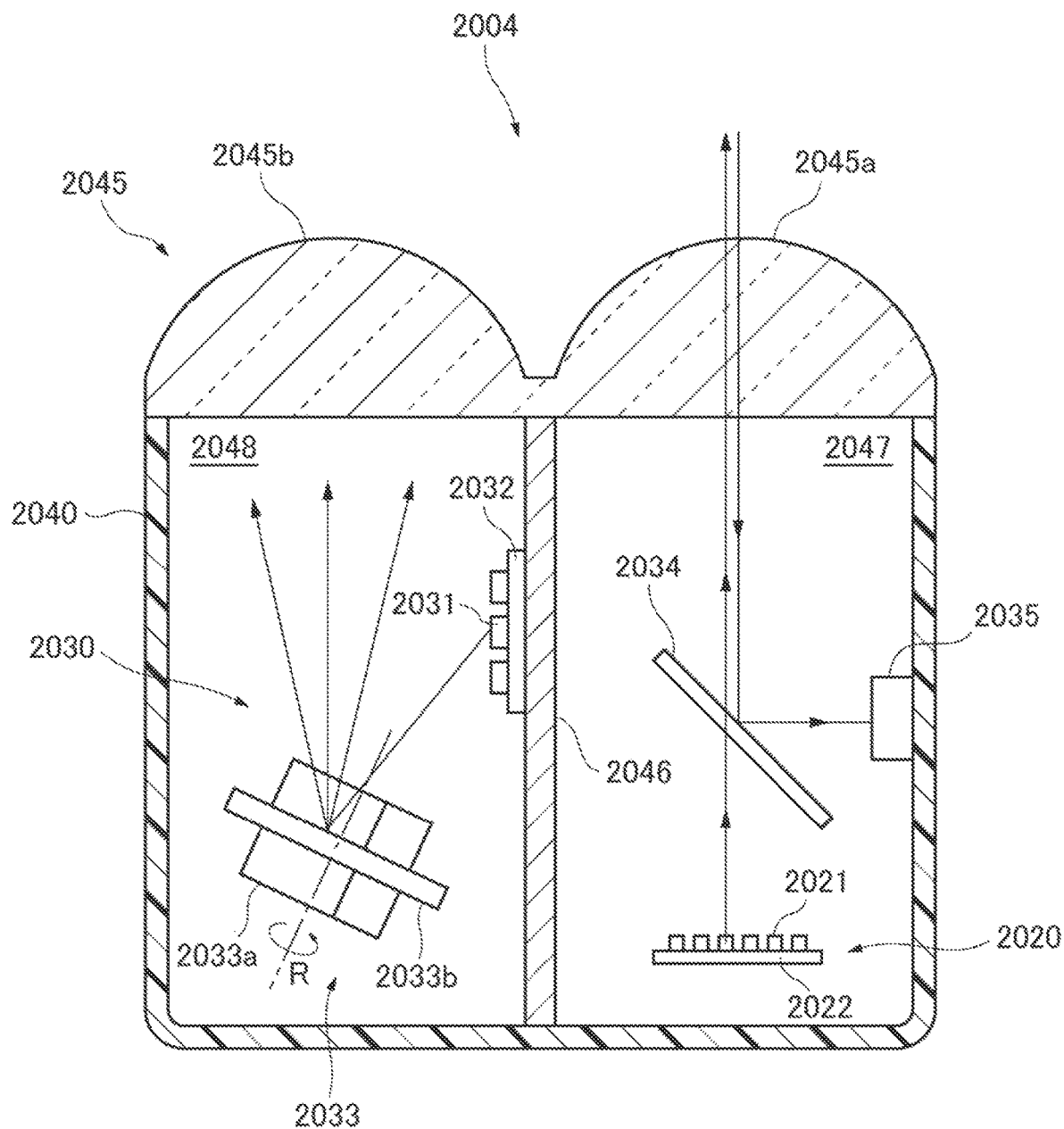
FIG. 16 is a schematic view showing an internal configuration of the vehicle infrared-sensor-equipped lamp.

FIG. 16 is a schematic view showing an internal configuration of the vehicle infrared-sensor-equipped lamp 2004. As shown in FIG. 16, the vehicle infrared-sensor-equipped lamp 2004 includes a housing 2040, a lens component 2045, a light shielding wall 2046, the visible light unit 2020, the infrared unit 2030, an infrared cut filter 2034, and an infrared sensor 2035.

An inside of the housing 2040 is partitioned by the light shielding wall 2046 into two spaces, namely a first lamp chamber 2047 and a second lamp chamber 2048. The visible light unit 2020, the infrared cut filter 2034, and the infrared sensor 2035 are provided in the first lamp chamber 2047. The infrared unit 2030 is provided in the second lamp chamber 2048.

The lens component 2045 is provided at a front portion of the housing 2040. The lens component 2045 includes a first lens portion 2045a and a second lens portion 2045b. The first lens portion 2045a is disposed at a front portion in the first lamp chamber 2047. The second lens portion 2045b is disposed at a front portion in the second lamp chamber 2048. The first lens portion 2045a and the second lens portion 2045b are integrally formed as the single lens component 2045.

The visible light unit 2020 includes a visible light source 2021 that emits visible light, and a board 2022 on which the visible light source 2021 is mounted. The visible light source 2021 is constituted by a plurality of visible light emitting diodes (LED). Lighting and extinguishing of the visible light source 2021 is controlled by the control unit 2101.

Figure 17:
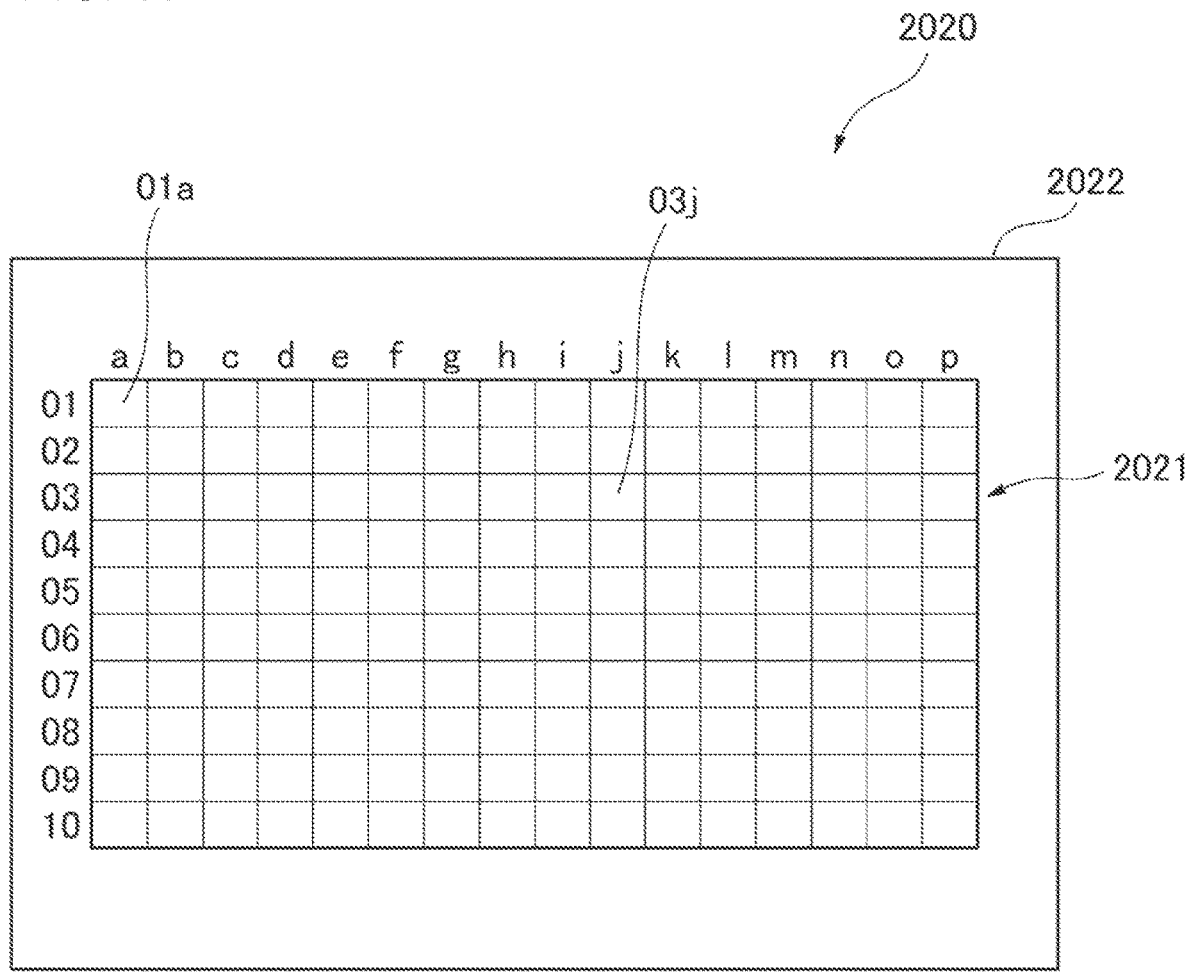
FIG. 17 is a front view of a visible light source mounted on the vehicle infrared-sensor-equipped lamp.

FIG. 17 is a front view of the visible light source 2021. As shown in FIG. 17, the visible light source 2021 includes a plurality of visible light LEDs two-dimensionally arrayed in the up-down direction (01 to 10) and the left-right direction (a to p). In the following description, a visible light LED located at an n-th (n is any one of 01 to 10) position from the top and at an x-th (x is any one of a to p) position from the left in FIG. 17 is referred to as a visible light LEDnx. For example, a visible light LED 03j is a visible light LED located at a 03-th position from the top and a j-th position from the left in FIG. 17. Visible light LEDs 01a to 10p can emit light in different directions. The visible light source 2021 is controlled by the control unit 2101, and illuminance of a specific region on the lamp front side is controlled by controlling an on-off state of a specific visible light LED. In the present embodiment, the control unit 2101 controls the visible light source 2021 such that a light distribution pattern suitable for visually recognizing the front of the vehicle 1 is formed by the visible light emitted from the visible light source 2021.

Referring back to FIG. 16, the infrared unit 2030 includes an infrared light source 2031 that emits infrared light, a board 2032 on which the infrared light source 2031 is mounted, and a rotating reflector 2033 that reflects infrared light. The infrared light source 2031 is constituted by a plurality of infrared laser diodes (LD). In the present embodiment, three infrared light sources 2031 are arranged in the up-down direction on the board 2032. Each infrared light source 2031 is provided at a position that does not overlap the first lens portion 2045a in a front view of the vehicle infrared-sensor-equipped lamp 2004. As a result, the infrared light emitted from the infrared light source 2031 is emitted toward the lamp front side without being shielded by the first lens portion 2045a. Timings when each of the infrared light sources 2031 is lighted and extinguished are controlled by the control unit 2101.

The rotating reflector 2033 is a scanning unit that transmits the infrared light emitted from the infrared light source 2031 toward a lamp front side to perform scanning. The rotating reflector 2033 rotates around a rotation axis R. The rotating reflector 2033 includes a shaft portion 2033a extending around the rotation axis R and a plurality of blades 2033b extending radially from the shaft portion 2033a. A surface of each blade 2033b is a reflecting surface. The reflecting surface has a twisted shape whose angle relative to the rotation axis R gradually changes in a circumferential direction. Specifically, when the infrared light emitted from the infrared light source 2031 is reflected by the reflecting surface provided on an outer peripheral surface of the rotating reflector 2033, a direction in which the infrared light is reflected and transmitted gradually changes from a left end to a right end according to a rotation phase of the rotating reflector 2033. A reflection point of the rotating reflector 2033 is disposed in the vicinity of a focal point of the second lens portion 2045b. An operation of the rotating reflector 2033 is controlled by the control unit 2101.

The control unit 2101 controls the infrared unit 2030 in order to form a light distribution pattern suitable for sensing an object such as another vehicle by the infrared light emitted from the infrared light source 2031. More specifically, the control unit 2101 controls the lighting timing of the infrared light source 2031 and the rotation phase of the rotating reflector 2033 so as to cause the infrared light source 2031 to emit infrared light toward any position as desired on the lamp front side.

Since the visible light source 2021 is used as a light source that emits light for visually recognizing the front of the vehicle 1, the visible light source 2021 is required to irradiate a wide range. On the other hand, since the infrared light source 2031 is used as a light source that emits light for sensing an object such as another vehicle, the infrared light source 2031 is required to irradiate a specific region with strong illuminance. For this reason, it is preferable to employ an LED whose emitted light has a large degree of diffusion as the visible light source 2021, and employ an LD whose emitted light has a small degree of diffusion as the infrared light source 2031.

The visible light emitted from the visible light source 2021 is incident on the first lens portion 2045a of the lens component 2045. The first lens portion 2045a transmits the incident visible light toward the lamp front side. The first lens portion 2045a functions as a projection lens that transmits the visible light emitted from the visible light source 2021 toward the lamp front side.

In addition, the first lens portion 2045a collects light from the lamp front side, for example, reflected light of infrared light that is emitted from the infrared light source 2031 and reflected by an object such as another vehicle, and guides the collected light to the infrared sensor 2035 via the infrared cut filter 2034. The first lens portion 2045a functions as a condenser lens that condenses infrared light on the infrared sensor 2035.

Infrared light that is emitted from the infrared light source 2031 and reflected by the rotating reflector 2033 is incident on the second lens portion 2045b of the lens component 2045. The second lens portion 2045b functions as a projection lens that transmits the infrared light emitted from the infrared light source 2031 toward the lamp front side.

The light shielding wall 2046 is provided between an optical axis of the first lens portion 2045a and an optical axis of the second lens portion 2045b. For example, the light shielding wall 2046 is provided at a position where the light shielding wall 2046 prevents the visible light emitted from the visible light source 2021 from being directly incident on the second lens portion 2045b without being incident on the first lens portion 2045a, and at a position where the light shielding wall 2046 prevents the infrared light emitted from the infrared light source 2031 from being directly incident on the first lens portion 2045a without being incident on the second lens portion 2045b.

The infrared cut filter 2034 is a reflective optical filter that reflects infrared light and thus prevents the infrared light from passing therethrough. The infrared cut filter 2034 is disposed between the visible light source 2021 and the first lens portion 2045a in the first lamp chamber. The infrared cut filter 2034 reflects infrared light, which is incident on the infrared cut filter 2034 from the lamp front side through the first lens portion 2045a, toward the infrared sensor 2035. In addition, the infrared cut filter 2034 allows the visible light emitted from the visible light source 2021 to pass therethrough. The visible light passing through the infrared cut filter 2034 is incident on the first lens portion 2045a.

The infrared sensor 2035 is constituted by a photodiode (PD) that detects infrared light. The infrared sensor 2035 is disposed in the vicinity of a virtual focal point of the first lens portion 2045a folded back by the infrared cut filter 2034. The infrared sensor 2035 outputs a signal corresponding to intensity of detected infrared light. The infrared sensor 2035 outputs a signal having higher signal intensity as the intensity of the detected infrared light becomes higher. The infrared sensor 2035 has the highest light receiving sensitivity at a peak wavelength of the infrared light emitted from the infrared light source 2031. The infrared sensor 2035 receives reflected light of the infrared light emitted from the infrared light source 2031 toward the lamp front side and detect a peak wavelength of the reflected light. Information on the reflected light acquired by the infrared sensor 2035 is transmitted to the control unit 2101. An operation of the infrared sensor 2035, for example, a sensing operation of detecting infrared light, is controlled based on a signal transmitted from the control unit 2101.

Next, control in which the control unit 2101 senses an object such as another vehicle will be described.

Figure 18:
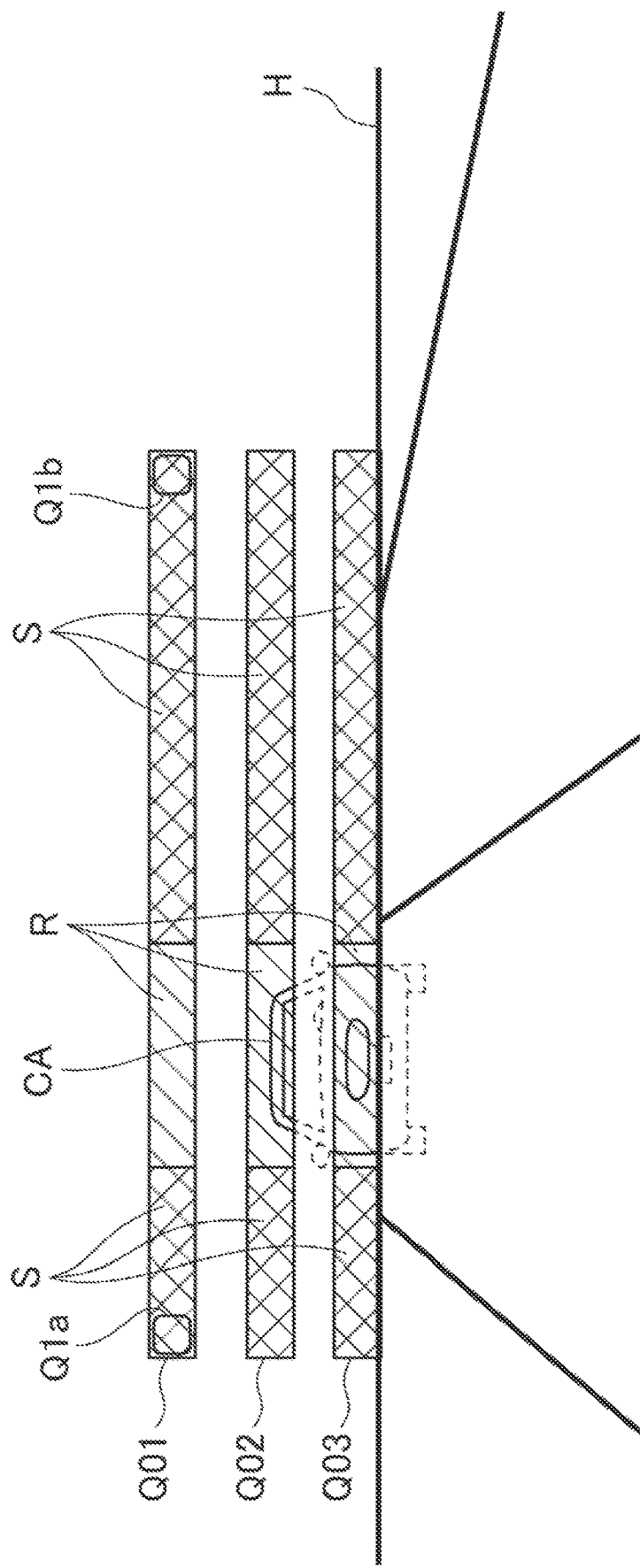
FIG. 18 is a schematic view showing an example of an infrared light distribution pattern.

FIG. 18 is a schematic view showing a region irradiated with the infrared light emitted from the infrared light source 2031 of the infrared unit 2030. The schematic view shown in FIG. 18 is displayed on, for example, a virtual vertical screen arranged 25 m ahead of the vehicle infrared-sensor-equipped lamp 2004.

The control unit 2101 controls the infrared unit 2030 to sense an object such as another vehicle by the infrared light emitted from the infrared light source 2031.

A range Q01 is a region irradiated with infrared light emitted from an uppermost infrared light source 2031 on the board 2032. Immediately after the uppermost infrared light source 2031 is lighted, a partial region Q1a of the range Q1 including a left end of the range Q1 is irradiated with infrared light. As the rotating reflector 2033 rotates, the region Q1a irradiated with infrared light is moved rightward. While the rotating reflector 2033 makes one rotation in this manner, the uppermost infrared light source 2031 irradiates all regions of the range Q1 with infrared light.

A range Q03 is a region irradiated with infrared light emitted from a lowermost infrared light source 2031 on the board 2032. Immediately after the lowermost infrared light source 2031 is lighted, a partial region of the range Q3 including a left end of the range Q3 is irradiated with infrared light. As the rotating reflector 2033 rotates, the region irradiated with infrared light is moved rightward. While the rotating reflector 2033 makes one rotation in this manner, the lowermost infrared light source 2031 irradiates all regions of the range Q3 with infrared light.

A range Q02 is a region irradiated with infrared light emitted from an infrared light source 2031 provided in the middle in the up-down direction on the board 2032. Immediately after the infrared light source 2031 provided in the middle is lighted, a partial region of the range Q2 including a left end of the range Q2 is irradiated with infrared light. As the rotating reflector 2033 rotates, the region irradiated with infrared light is moved rightward. While the rotating reflector 2033 makes one rotation in this manner, the infrared light source 2031 in the middle irradiates all regions of the range Q2 with infrared light.

The ranges Q01, Q02, and Q03 each have a linear shape extending in the left-right direction. Each of the ranges Q01 to Q03 preferably has an up-down width of 0.4 degree or more in the vertical direction. The region of the range Q03 overlaps the line H.

Infrared light emitted from the infrared unit 2030 is reflected by an object on the lamp front side. The reflected infrared light is passed through the first lens portion 2045a, reflected by the infrared cut filter 2034, and guided to the infrared sensor 2035.

As shown in FIG. 18, in a case where another vehicle CA is present in front of the own vehicle, when the infrared light source 2031 that irradiates a region occupied by the other vehicle CA is lighted, the infrared sensor 2035 detects infrared light having strong intensity. When signal intensity output from the infrared sensor 2035 is equal to or higher than a predetermined value, the control unit 2101 determines that the other vehicle CA is present in the range. Each rotation phase of the rotating reflector 2033 and a region (position) irradiated with infrared light by the infrared light source 2031 at that time are recorded in advance in a memory. The control unit 2101 can access the memory. When the infrared sensor 2035 outputs a signal having the signal intensity equal to or higher than the predetermined value, the control unit 2101 acquires the rotation phase of the rotating reflector 2033, acquires the region irradiated with the infrared light, and determines that the other vehicle CA is present in the region irradiated with the infrared light.

Next, control in which the control unit 2101 changes a light distribution pattern of visible light based on a result of the above-described sensing will be described.

Figure 19:
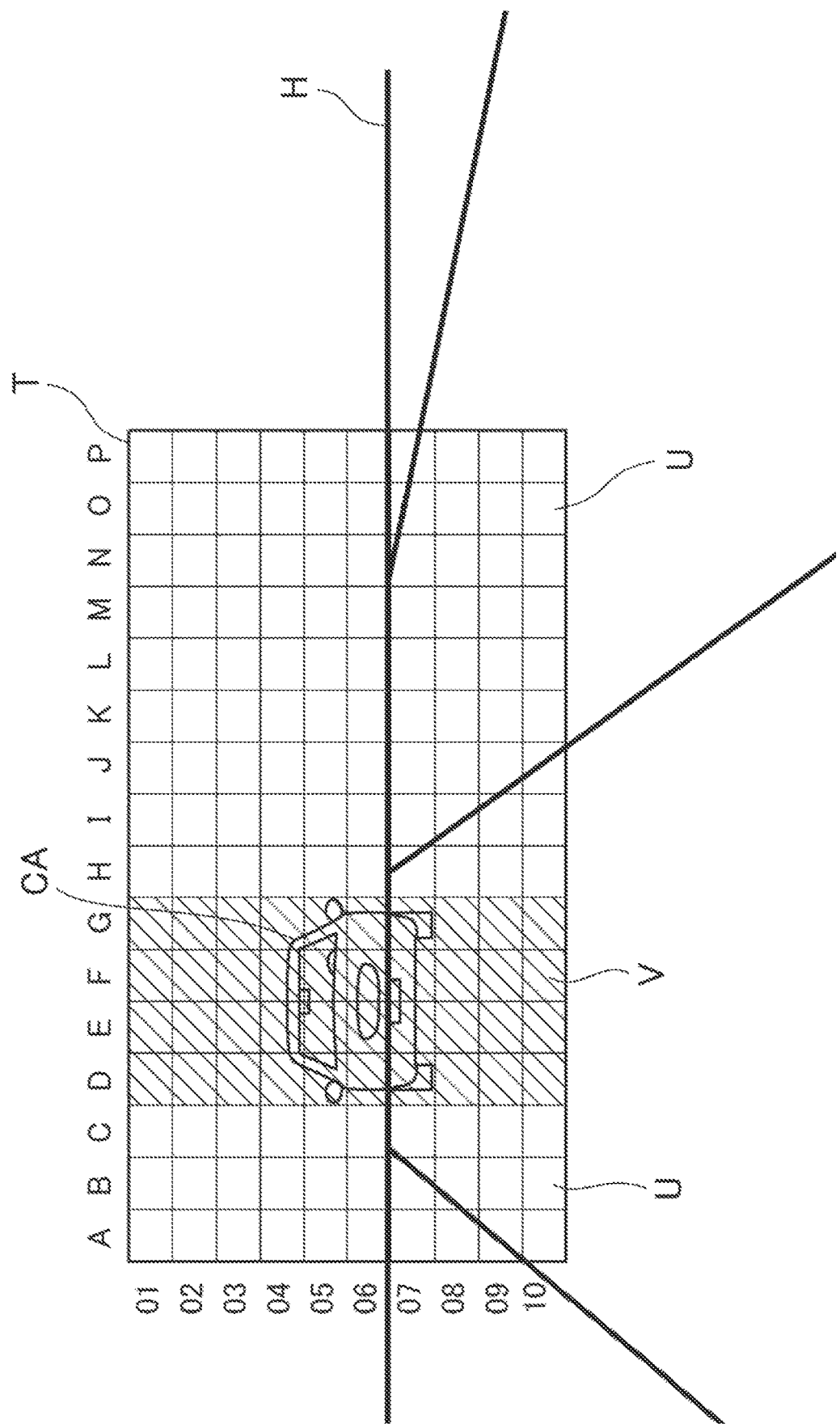
FIG. 19 is a schematic view showing an example of a visible light distribution pattern.

FIG. 19 is a schematic view showing an example of a visible light distribution pattern formed by visible light emitted from the visible light source 2021 of the visible light unit 2020. FIG. 19 is also displayed on the virtual vertical screen arranged in the same manner as in FIG. 18.

An irradiable range T is a maximum range that can be irradiated with visible light by the vehicle infrared-sensor-equipped lamp 2004, and can be irradiated by lighting all the visible light LEDs 01a to 10p of the visible light source 2021. In FIG. 19, for convenience of description, the irradiable range T is divided into 10 regions in the vertical direction and 11 regions in the horizontal direction. In the irradiable range T, a region specified by an N-th region (N is any one of 01 to 10) from the top in the vertical direction and an X-th region (X is any one of A to P) from the left in the horizontal direction is referred to as a region TNX. For example, when the visible light LED 01a located at an upper left end in FIG. 17 is lighted, a range T01A located at an upper left end in FIG. 19 is irradiated with visible light. In addition, when the visible light LED 06p is lighted, a range T06P in FIG. 19 is irradiated with visible light.

In addition, an entire region in the vertical direction in an X-th row from the left in the horizontal direction is referred to as a range TX. The range TX is a band-shaped irradiation range extending in the up-down direction. For example, 01-st to 10-th regions in the vertical direction in a D-th row from the left in the horizontal direction are referred to as a range TD. When the visible light LEDs 01d to 10d in the vertical direction in FIG. 17 are lighted, the range TD is irradiated with visible light. In addition, an entire region in the horizontal direction in an N-th row from the top in the vertical direction is referred to as a range TN. The range TN is a band-shaped irradiation range extending in the left-right direction. For example, A-th to P-th regions in the horizontal direction in a seventh row from the top in the vertical direction are referred to as a range T07. When the visible light LEDs 07a to 07p in FIG. 17 are lighted, the range T07 is irradiated with visible light. In this example, the line H is located between a range Q06 and a range Q07.

In a normal state in which an object such as another vehicle is not present in front of the own vehicle, the control unit 2101 sets the entire region of the irradiable range T as a normal region U, and controls the visible light source 2021 to irradiate the region with visible light at predetermined illuminance.

The control unit 2101 changes the visible light distribution pattern in accordance with the signal output from the infrared sensor 2035. For example, when the other vehicle CA is detected based on the signal output from the infrared sensor 2035, the control unit 2101 sets a dimming region V in a region where the other vehicle CA is present in the irradiable range T, and sets the normal region U in a region where the other vehicle CA is not present. The control unit 2101 controls the visible light source 2021 such that a dimming region V is irradiated with visible light having illuminance lower than that of the normal region U. The control unit 2101 changes a visible light distribution pattern formed in the irradiable range T such that the region where the other vehicle CA is detected is weakly irradiated with visible light.

As shown in FIG. 19, for example, the control unit 2101 sets ranges TD to TG, where the other vehicle CA is determined to be present based on the signal output from the infrared sensor 2035, as the dimming region V, and sets the other region as the normal region U. The control unit 2101 supplies a current having a first current value to visible light LEDs 01d to 01g, 02d to 02g, 03d to 03g, 04d to 04g, 05d to 05g, 06d to 06g, 07d to 07g, 08d to 08g, 09d to 09g, and 10d to 10g, and supplies a current having a second current value larger than the first current value to the other visible light LEDs. Although a preceding vehicle that is present in front of the own vehicle is shown as the other vehicle CA in the present embodiment, the other vehicle is not limited thereto. The other vehicle may be, for example, an oncoming vehicle.

The vehicle infrared-sensor-equipped lamp 2004 according to the present embodiment is configured such that the visible light emitted from the visible light source 2021 passes through the infrared cut filter 2034 and is incident on the first lens portion 2045a, and the infrared light incident on the infrared cut filter 2034 from the lamp front side through the first lens portion 2045a is reflected toward the infrared sensor 2035. According to this configuration, the first lens portion 2045a provided as the projection lens that projects the visible light toward the lamp front side can also function as a condenser lens that condenses infrared light on the infrared sensor 2035. For this reason, since the number of components constituting the vehicle infrared-sensor-equipped lamp 2004 can be reduced, it is easy to reduce size and weight of the lamp 2004. Therefore, even if the infrared sensor 2035 is mounted on the lamp 2004, it is possible to prevent the increase in the size and weight of the vehicle 1.

In addition, according to the vehicle infrared-sensor-equipped lamp 2004, when the other vehicle CA is detected based on the output signal of the infrared sensor 2035, the visible light distribution pattern formed in the irradiable range T is changed such that the visible light is weakly irradiated to the region where the other vehicle CA is detected. For this reason, it is possible to reduce illuminance of the visible light with which the region of the detected other vehicle CA is irradiated, and thus it is possible to reduce glare given to the other vehicle CA.

In addition, according to the vehicle infrared-sensor-equipped lamp 2004, the light shielding wall 2046 is provided to prevent the visible light emitted from the visible light source 2021 from being directly incident on the second lens portion 2045b and prevent the infrared light emitted from the infrared light source 2031 from being directly incident on the first lens portion 2045a. For this reason, when the visible light source 2021 emits visible light, the visible light of the visible light source 2021 can be prevented from being projected from the second lens portion 2045b, and any visible light distribution pattern can be formed as desired by the visible light projected from the first lens portion 2045a. In addition, at the time of light detection performed by the infrared sensor 2035, the light from the infrared light source 2031 can be prevented from being directly incident on the infrared sensor 2035, and thus detection accuracy of the infrared sensor 2035 can be improved.

Modification

Although an example in which a photodiode is used as the infrared sensor 2035 has been described in the above-described embodiment, the present invention is not limited thereto. An infrared camera 2135 may also be used as the infrared sensor.

Figure 20:
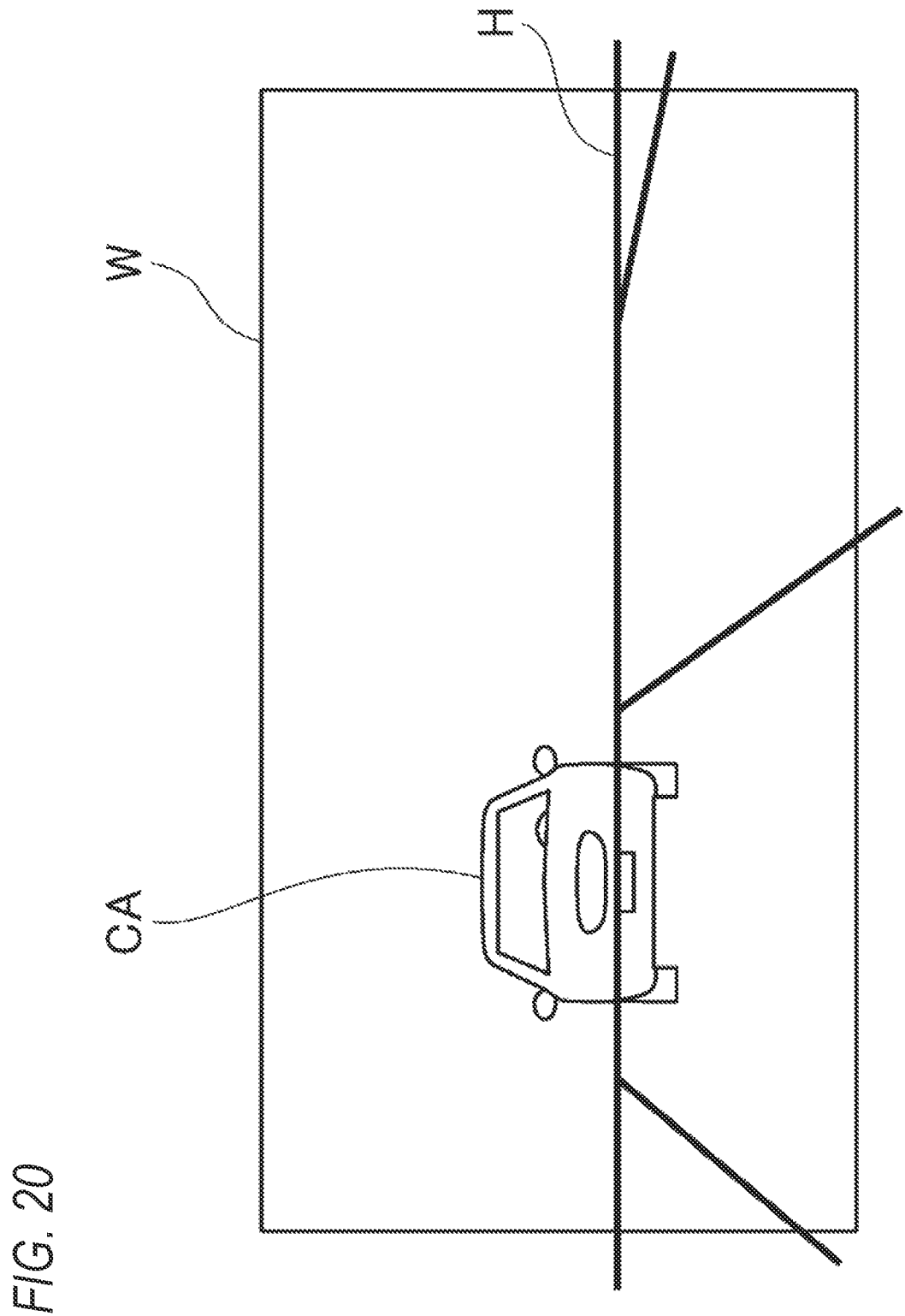
FIG. 20 shows an example of an image captured by an infrared camera at time t.
Figure 21:
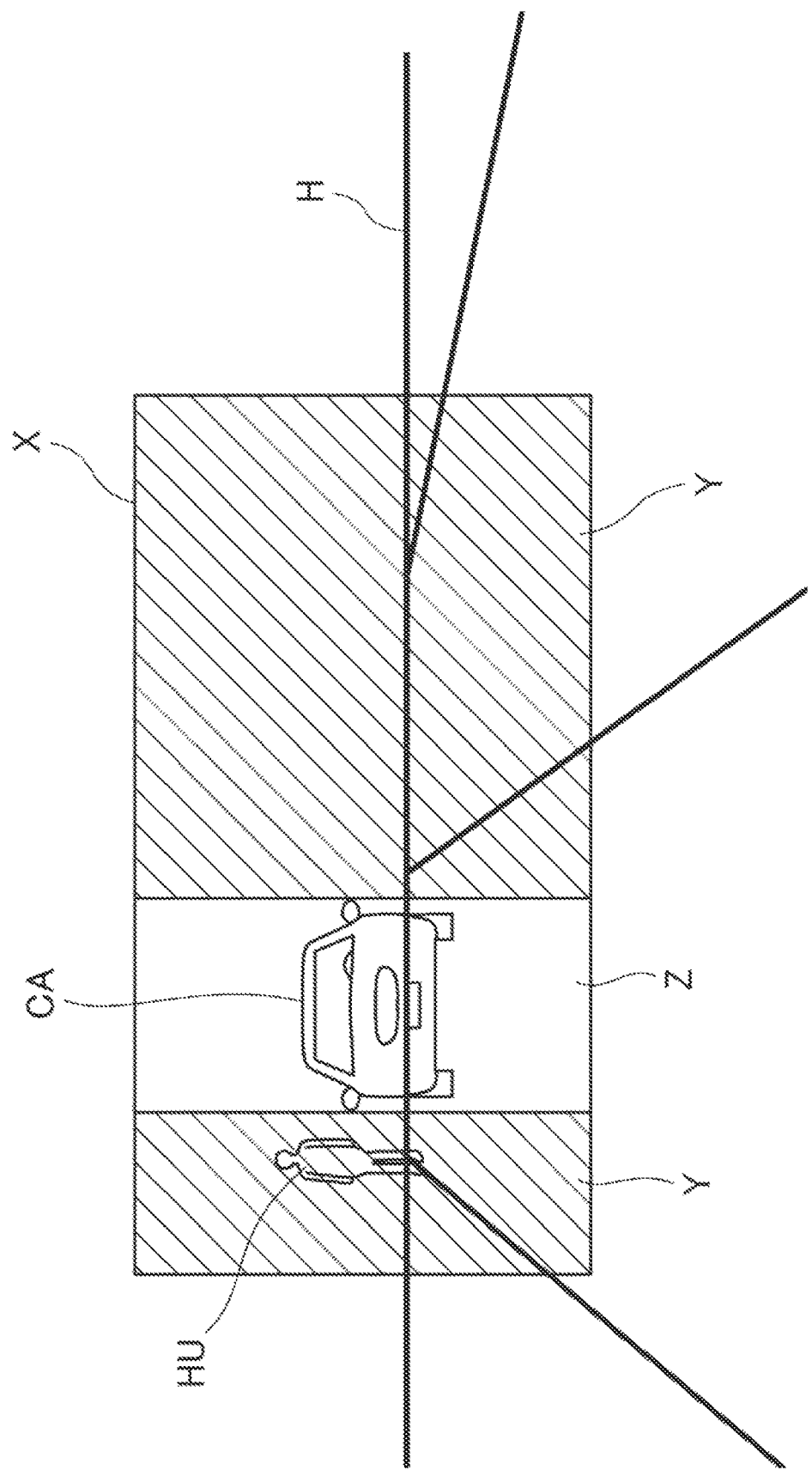
FIG. 21 is a schematic view showing an example of the infrared light distribution pattern radiated at time t+1.

FIG. 20 shows an image of the lamp front side captured by the infrared camera 2135 at certain time t. FIG. 21 shows an example of an infrared light distribution pattern formed by infrared light emitted from the infrared unit 2030 at time t+1.

In the above-described embodiment, an example in which the infrared light emitted from the infrared light source 2031 is swept in the linear ranges Q1 to Q3 by the rotating reflector 2033 (see FIG. 18) has been described. However, in this example, infrared light is uniformly irradiated to a wide range on the lamp front side as shown by an irradiation range X shown in FIG. 21. According to such a light distribution, for example, the infrared light may be swept at a high speed by adjusting a rotation speed of the rotating reflector 2033 such that the infrared light is irradiated to the entire range within exposure time of the infrared camera 2135. Alternatively, a wide range on the lamp front side may be irradiated with infrared light by the arrayed infrared light sources 2031 and a projection lens disposed in front of the infrared light sources 2031, without using the rotating reflector 2033.

The control unit 2101 sets an entire region of the irradiation range X as a normal region Y in an initial state where sensing is started, and controls the infrared light source 2031 such that infrared light is irradiated to the region at predetermined illuminance.

The infrared camera 2135 is a camera having highest sensitivity to the peak wavelength of the infrared light emitted from the infrared light source 2031. The infrared camera 2135 can acquire an image corresponding to reflected light of the infrared light emitted from the infrared light source 2031 to the lamp front side. The infrared camera 2135 outputs a signal corresponding to intensity of detected infrared light. An operation of the infrared camera 2135 may be controlled by the control unit 2101 or may be controlled by the vehicle control unit 3.

Infrared light that is emitted from the infrared unit 2030 and reflected by an object on the lamp front side is reflected by the infrared cut filter 2034 through the first lens portion 2045a and guided to the infrared camera 2135. The infrared camera 2135 captures an image W as shown in FIG. 20, for example, at the time t in accordance with detected infrared light. The image W captured by the infrared camera 2135 is transmitted to the control unit 2101. The control unit 2101 determines whether an object such as another vehicle is present in the captured image W.

Based on the image W captured at the time t, the control unit 2101 changes an infrared light distribution pattern of the irradiation range X according to a signal output from the infrared camera 2135 at the time t+1. For example, when the other vehicle CA is detected based on the signal output from the infrared camera 2135, the control unit 2101 sets a dimming region Z in a region where the other vehicle CA is present in the irradiation range X, and sets the normal region Y in a region where the other vehicle CA is not present, as shown in FIG. 21. The control unit 2101 controls the infrared light source 2031 such that the dimming region Z is irradiated with infrared light having illuminance lower than that of the normal region Y. The control unit 2101 changes the infrared light distribution pattern of the irradiation range X such that the region where the other vehicle CA is detected is weakly irradiated with infrared light.

For example, in a case where the irradiation range X is irradiated with infrared light by sweeping the infrared light by the rotating reflector 2033, the current having the first current value is supplied to the infrared light source 2031 when the rotating reflector 2033 reaches a rotation phase for irradiating the dimming region Z, and the current having the second current value higher than the first current value is supplied to the infrared light source 2031 when the rotating reflector 2033 reaches a rotation phase for irradiating the normal region Y.

Alternatively, in a case where the infrared unit 2030 includes the infrared light sources 2031 arrayed on the board 2032, the current having the first current value is supplied to the infrared light sources 2031 that irradiate the dimming region Z, and the current having the second current value is supplied to the infrared light sources 2031 that irradiate the normal region Y.

In addition, although the region where the other vehicle CA is detected is set as the dimming region Z, and the region other than the dimming region Z is set as the normal region Y in the modification, the present invention is not limited thereto. For example, the region where the other vehicle CA is detected may be set as the normal region, and the region other than the normal region may be set as an emphasized region. When the emphasized region is irradiated, a current having a third current value larger than the second current value is supplied to the infrared light source 2031 such that the emphasized region is irradiated with infrared light stronger than infrared light irradiated to the normal region.

In addition, according to the vehicle infrared-sensor-equipped lamp 2004, in the infrared light distribution pattern, the dimming region Z is formed in the region where the other vehicle CA having high infrared reflection intensity is present. For this reason, it is possible to irradiate the other vehicle CA present in the irradiation range X with infrared light having weak illuminance, and thus it is possible to weaken intensity of infrared light reflected from the other vehicle CA. Therefore, it is possible to prevent occurrence of halation caused by the infrared light reflected from the other vehicle CA in the image captured by the infrared camera 2135 of the own vehicle 1, and thus it is possible to improve detection accuracy of the object such as the other vehicle on the lamp front side.

In addition, in the case where the region where the other vehicle CA is detected is set as the normal region and the region other than the normal region is set as the emphasized region, for example, as shown in FIG. 21, an object having low infrared reflection intensity such as a pedestrian HU in the vicinity of the other vehicle CA is easily detected by the infrared camera 2135.

It should be noted that the present invention is not limited to the above-described embodiments, and modifications, improvements, and the like can be made as appropriate. In addition, materials, shapes, dimensions, numerical values, forms, numbers, arrangement places, and the like of the respective constituent elements in the above-described embodiments are set as desired and are not limited as long as the present invention can be achieved.

In addition, although the visible light source including the plurality of two-dimensionally arrayed visible light LEDs is used as a unit for changing the light distribution pattern of the visible light emitted from the visible light source 2021 in the above-described embodiment, the present invention is not limited thereto. For example, similarly to the infrared unit 2030 shown in FIG. 16, the light distribution pattern may be changed by using a rotating reflector.

Fourth Embodiment

For example, as for a sensor-mounted lamp including two types of light sources, such as a light source that emits visible light suitable for a camera or a driver and a light source that emits light suitable for a sensor, the lamp may be increased in size and thus the lamp is not easily installed on a vehicle.

A fourth embodiment of the present invention provides an optical-sensor-equipped lamp whose increase in size is prevented and whose installation on a vehicle is improved.

Figure 22:
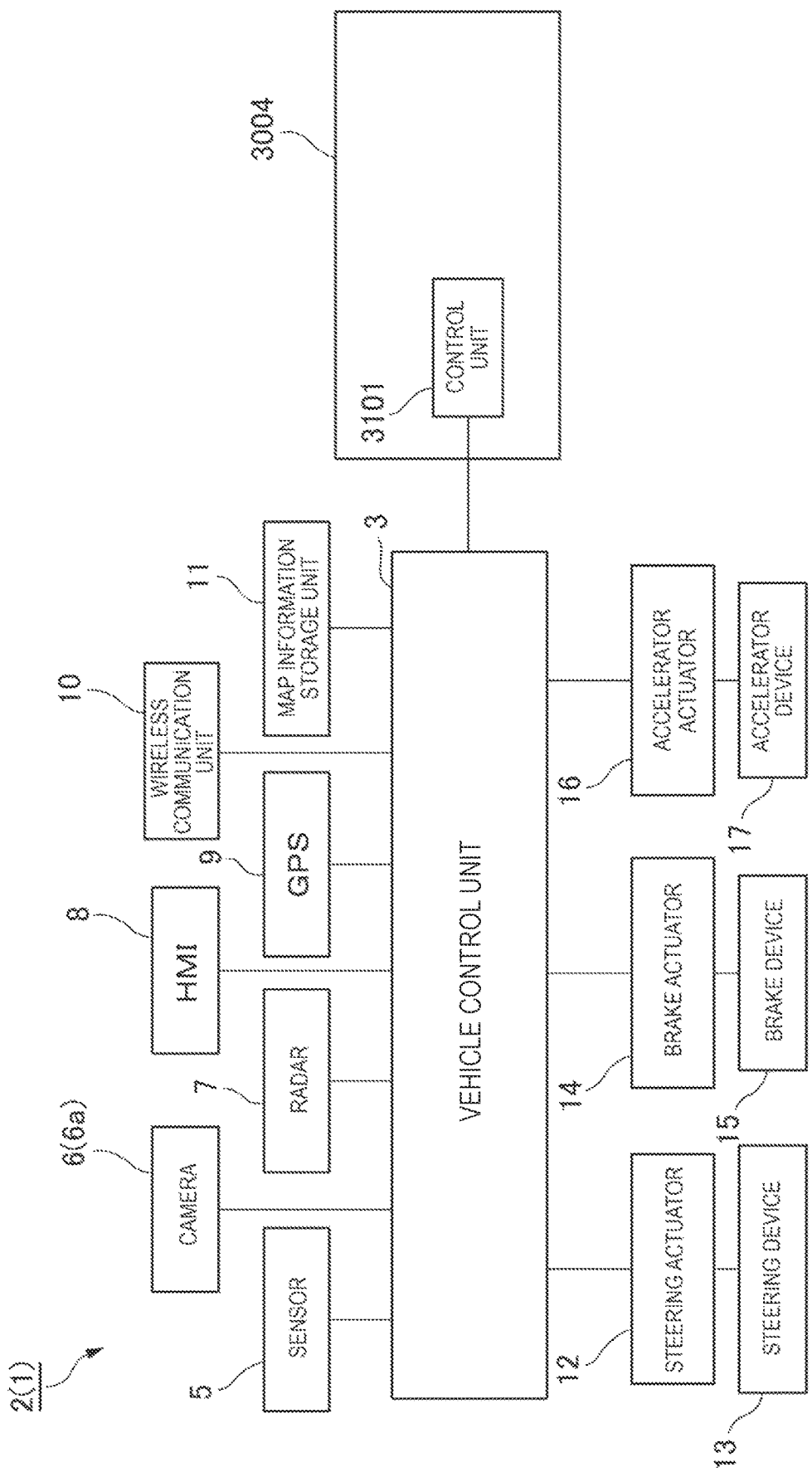
FIG. 22 is a block diagram showing a vehicle system in which an optical-sensor-equipped lamp according to a fourth embodiment of the present invention is incorporated.

FIG. 22 is a block diagram showing a vehicle system 2 in which an optical-sensor-equipped lamp 3004 according to the embodiment of the present invention is incorporated. The vehicle 1 on which the vehicle system 2 is mounted is a vehicle (automobile) that can travel in the automatic driving mode as in the first embodiment described above. As shown in FIG. 22, the vehicle system 2 includes the vehicle control unit 3, the optical-sensor-equipped lamp 3004, the sensor 5, the camera 6, the radar 7, the human machine interface (HMI) 8, the global positioning system (GPS) 9, the wireless communication unit 10, and the map information storage unit 11. The vehicle system 2 further includes the steering actuator 12, the steering device 13, the brake actuator 14, the brake device 15, the accelerator actuator 16, and the accelerator device 17.

The optical-sensor-equipped lamp 3004 is a lamp capable of emitting visible light and infrared light. The optical-sensor-equipped lamp 3004 is a lamp (for example, a headlamp or the like) mounted on the front portion of the vehicle 1. The optical-sensor-equipped lamp 3004 includes a control unit 3101 that controls an operation of the lamp 3004. The control unit 3101 is communicably connected to the vehicle control unit 3. When a predetermined condition is satisfied, the vehicle control unit 3 generates an instruction signal for controlling lighting and extinguishing of the optical-sensor-equipped lamp 3004, and transmits the instruction signal to the control unit 3101. The control unit 3101 controls the operation of the optical-sensor-equipped lamp 3004 based on the received instruction signal. Information acquired by the control unit 3101 and information acquired by the vehicle control unit 3 are transmitted and received between each other.

The camera (in-vehicle camera) 6 is, for example, a camera including an imaging element such as a charge-coupled device (CCD) or a complementary MOS (CMOS). Imaging of the camera 6 is controlled based on a signal transmitted from the vehicle control unit 3. The camera 6 can generate an image based on received visible light. The camera 6 may also be an infrared camera that detects infrared light. The infrared camera can generate an image based on received infrared light.

Figure 23:
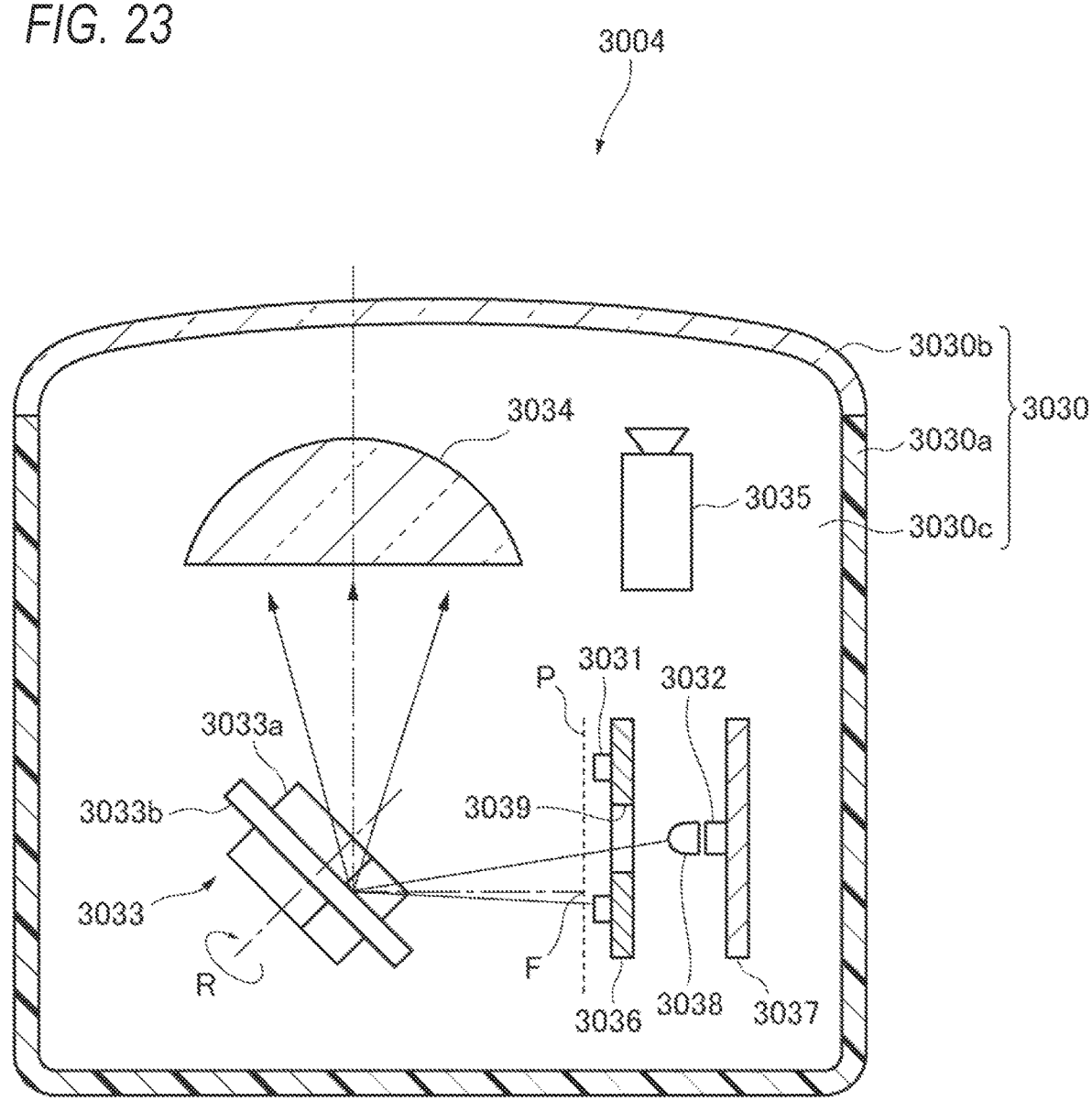
FIG. 23 is a schematic view showing an internal configuration of the optical-sensor-equipped lamp.

FIG. 23 is a schematic view showing an internal configuration of the optical-sensor-equipped lamp 3004. As shown in FIG. 23, the optical-sensor-equipped lamp 3004 includes a housing 3030, a first light source 3031, a second light source 3032, a rotating reflector 3033 (an example of a scanning unit), a projection lens 3034, an infrared sensor 3035 (an example of an optical sensor), a first board 3036, and a second board 3037.

The housing 3030 includes a body portion 3030a that includes an opening on a front side thereof, and a transparent outer cover 3030b attached to cover the opening of the body portion 3030a. The first light source 3031, the second light source 3032, the rotating reflector 3033, the projection lens 3034, the infrared sensor 3035, and the like are accommodated in one lamp chamber 3030c formed by the body portion 3030a and the outer cover 3030b.

The first light source 3031 emits visible light for the driver to visually recognize the surroundings of the vehicle 1 or for the camera 6 to capture an image. The first light source 3031 is constituted by a plurality of light emitting diodes (LED). The first light source 3031 (hereinafter referred to as the "visible light LED 3031" in the present embodiment) is mounted on the first board 3036. Lighting and extinguishing of the visible light LED 3031 is controlled by the control unit 3101. A detailed configuration of the first light source 3031 will be described later with reference to FIG. 24.

The second light source 3032 emits light for sensing an object such as another vehicle present in front of the vehicle 1. The second light source 3032 emits light having a peak wavelength different from a peak wavelength of light emitted from the first light source 3031. In the present embodiment, the second light source 3032 emits infrared light having a wavelength longer than that of visible light. The second light source 3032 is constituted by a laser diode (LD). The second light source 3032 (hereinafter referred to as the "infrared LD 3032" in the present embodiment) is mounted on the second board 3037. Lighting and extinguishing of the infrared LD 3032 is controlled by the control unit 3101. A collimating lens 3038 is provided in an emission direction of the infrared LD 3032. The collimating lens 3038 converts the infrared light emitted from the infrared LD 3032 into a parallel beam.

Since the first light source 3031 is used as a light source that emits light for checking the front of the vehicle 1, the first light source 3031 is required to irradiate a wide range. On the other hand, since the second light source 3032 is used as a light source that emits light for detecting an object such as another vehicle, the second light source 3032 is required to irradiate a specific region with strong illuminance. Therefore, it is preferable to employ an LED whose emitted light has a relatively large degree of diffusion as the first light source 3031 and employ an LD whose emitted light has a small degree of diffusion as the second light source 3032.

The rotating reflector 3033 is a scanning unit that transmits the visible light emitted from the visible light LED 3031 and the infrared light emitted from the infrared LD 3032 toward the lamp front side to perform scanning. The rotating reflector 3033 rotates around a rotation axis R. The rotating reflector 3033 includes a shaft portion 3033a extending around the rotation axis R, and a plurality of (three in this example) blades 3033b (an example of a reflection unit) extending radially from the shaft portion 3033a. Angles of twist of the respective blades are different from each other. A surface of each blade 3033b is a reflecting surface. The reflecting surface has a twisted shape whose angle relative to the rotation axis R gradually changes in a circumferential direction.

In the rotating reflector 3033, a portion that reflects the visible light emitted from the visible light LED 3031 toward the lamp front side and a portion that reflects the infrared light emitted from the infrared LD 3032 toward the lamp front side are the same reflector (blade 3033b) or an integrated reflector (blade 3033b). A reflection point of the rotating reflector 3033 is set in the vicinity of a focal point of the projection lens 3034. An operation of the rotating reflector 3033 is controlled by the control unit 3101. The control unit 3101 controls lighting timings of the visible light LED 3031 and the infrared LD 3032 and a rotation phase of the rotating reflector 3033 so as to transmit the visible light of the visible light LED 3031 and the infrared light of the infrared LD 3032 toward any region as desired on the lamp front side.

Specifically, when the visible light emitted from the visible light LED 3031 is reflected by the reflecting surface of the rotating reflector 3033, a direction in which the visible light is reflected and transmitted gradually changes, for example, from left to right according to the rotation phase of the rotating reflector 3033. In addition, when the infrared light emitted from the infrared LD 3032 is reflected by the reflecting surface of the rotating reflector 3033, a direction in which the infrared light is reflected and transmitted gradually changes from left to right according to the rotation phase of the rotating reflector 3033.

The projection lens 3034 is provided in the lamp chamber 3030c. The projection lens 3034 is provided between the outer cover 3030b and the rotating reflector 3033. Light that is emitted from the visible light LED 3031 and the infrared LD 3032 and reflected by the rotating reflector 3033 is incident on the projection lens 3034. The projection lens 3034 projects incident visible light of the visible light LED 3031 and incident infrared light of the infrared LD 3032 to the lamp front side.

The infrared sensor 3035 is constituted by a photodiode (PD) that detects infrared light. The infrared sensor 3035 outputs a signal corresponding to intensity of detected infrared light. The infrared sensor 3035 outputs a signal having higher signal intensity as the intensity of the detected infrared light becomes higher. The infrared sensor 3035 has the highest light receiving sensitivity at a peak wavelength of the infrared light emitted from the infrared LD 3032. The infrared sensor 3035 detects reflected light of the infrared light emitted from the infrared LD 3032 toward the lamp front side. Information on the reflected light acquired by the infrared sensor 3035 is transmitted to the control unit 3101. An operation of the infrared sensor 3035, for example, a sensing operation of detecting infrared light, is controlled by the control unit 3101.

For example, the first board 3036 is provided such that an emission surface of the visible light LED 3031 mounted on the first board 3036 faces the blade 3033b of the rotating reflector 3033. The first board 3036 has a function of supplying power to the visible light LED 3031. The first board 3036 supplies power to the visible light LED 3031 via a power supply pattern formed on the first board 3036.

For example, the second board 3037 is provided such that an emission surface of the infrared LD 3032 mounted on the second board 3037 faces the blade 3033b of the rotating reflector 3033. The second board 3037 has a function of supplying power to the infrared LD 3032. The second board 3037 supplies power to the infrared LD 3032 via a power supply pattern formed on the second board 3037. The second board 3037 is provided behind the first board 3036 when viewed from the blade 3033b.

In the present embodiment, the first board 3036 is provided to be parallel to the second board 3037.

The visible light LED 3031 of the first board 3036 is provided at a position closer to a focal plane P passing through a virtual focal point F of the projection lens 3034 than the infrared LD 3032 of the second board 3037. The virtual focal point F means a focal point of the projection lens 3034 when folded back by the blade 3033b of the rotating reflector 3033. The focal plane P means a plane orthogonal to an optical axis of the infrared LD 3032 among planes passing through the virtual focal point F.

Figure 24:
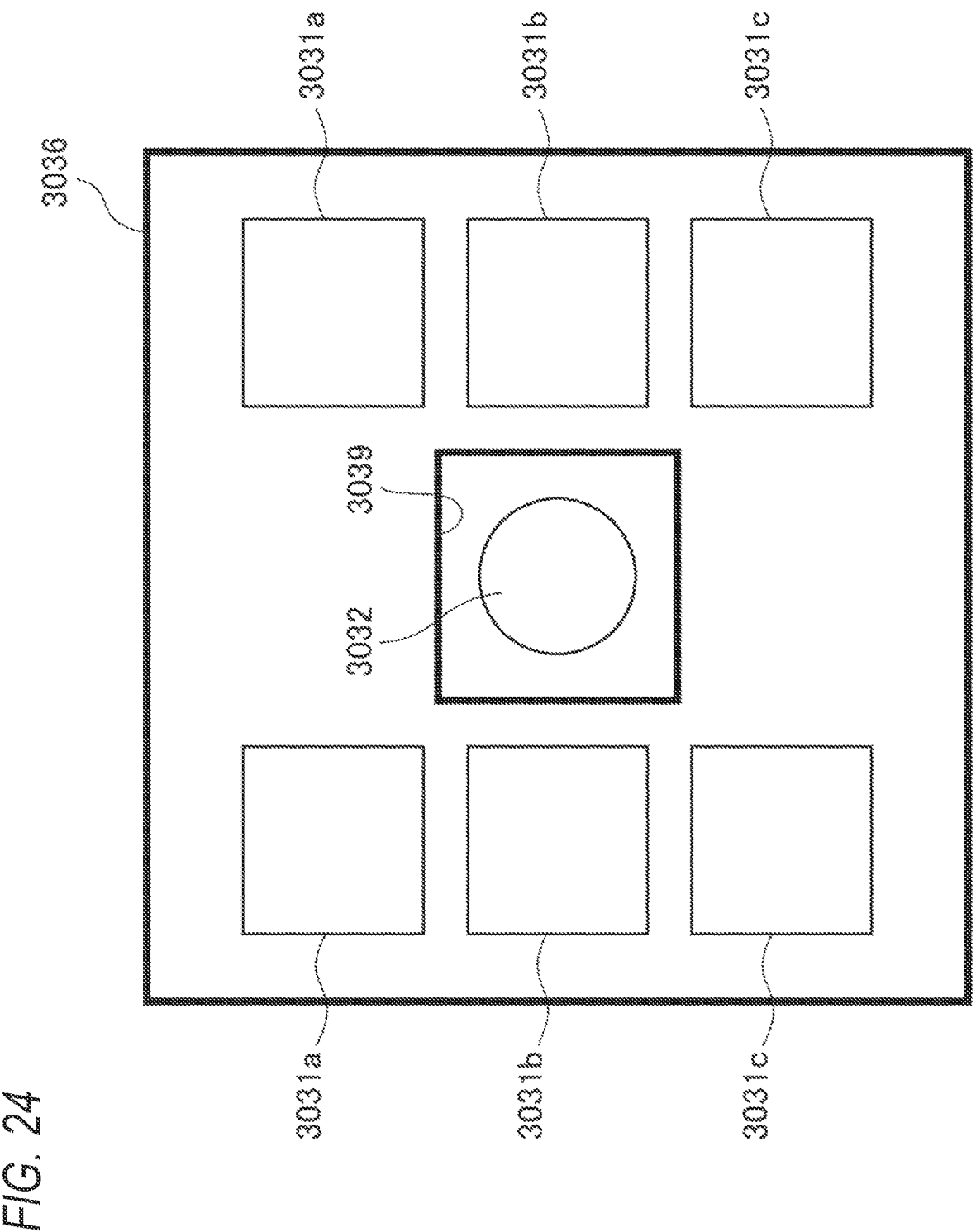
FIG. 24 is a front view of a first board.

FIG. 24 shows the first board 3036 on which the visible light LED 3031 is mounted, as viewed from a front side of the first board 3036 (a side on which the visible light LED 3031 is mounted). As shown in FIG. 24, in the present embodiment, six visible light LEDs 3031 are provided on the first board 3036. A gap portion 3039 is provided in a central portion of the first board 3036.

The gap portion 3039 penetrates the first board 3036. The gap portion 3039 is provided at a position where the infrared light emitted from the infrared LD 3032 of the second board 3037 can pass therethrough toward the blade 3033b of the rotating reflector 3033. The gap portion 3039 is provided on the optical axis of the infrared LD 3032 mounted on the second board 3037. As shown in FIG. 24, when the first board 3036 and the second board 3037 are viewed from the vertical direction of the second board 3037, the gap portion 3039 is provided such that a position and a size thereof allow the infrared LD 3032 to be visually recognized through the gap portion 3039.

Figure 25:
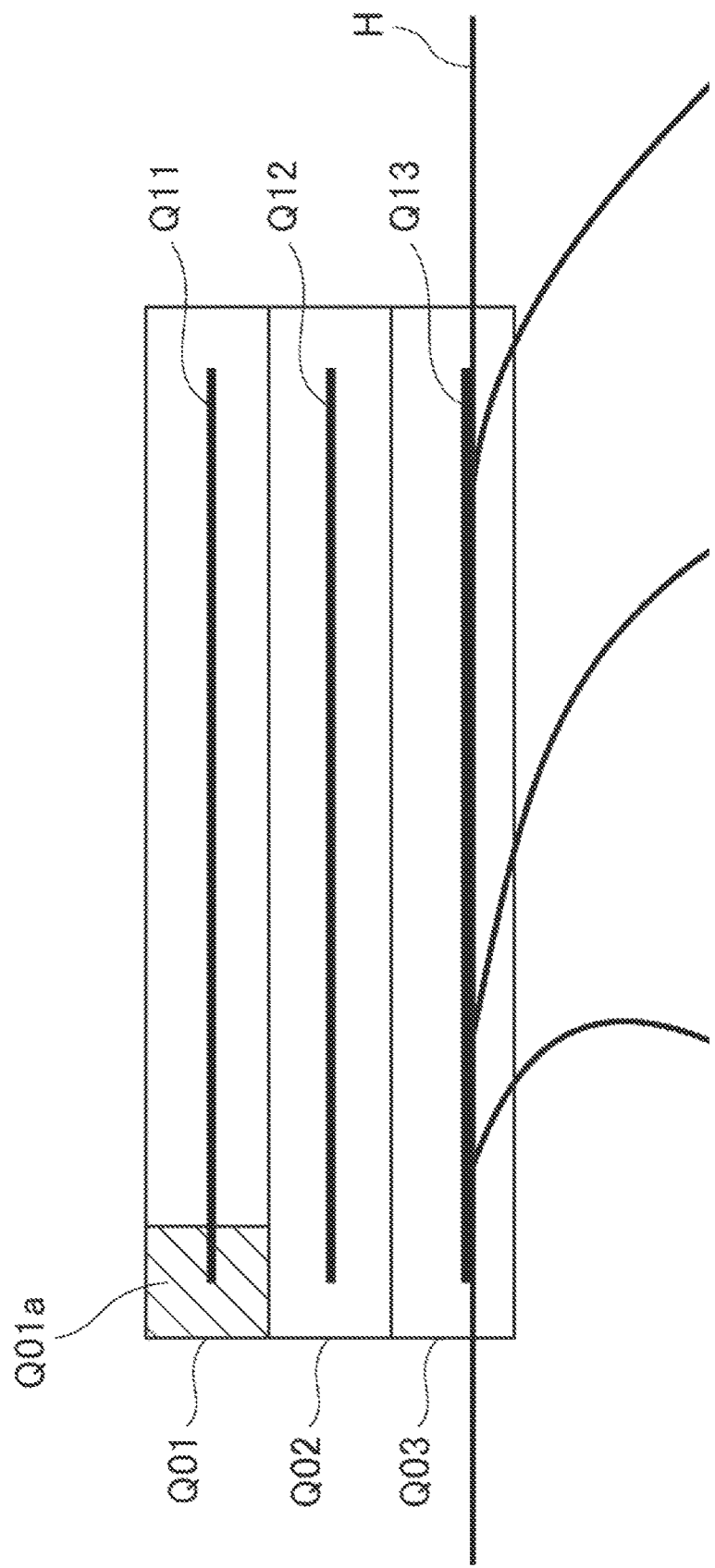
FIG. 25 is a schematic view showing an irradiation range of each type of light emitted from the optical-sensor-equipped lamp.

FIG. 25 is a schematic view showing irradiation ranges of the visible light and the infrared light emitted from the optical-sensor-equipped lamp 3004 of the present embodiment. The irradiation ranges shown in FIG. 25 are each displayed on, for example, a virtual vertical screen arranged 25 m ahead of the optical-sensor-equipped lamp 3004.

Ranges Q01, Q02, and Q03 are irradiation ranges of the visible light emitted from the visible light LED 3031 of the first board 3036. The ranges Q01 to Q03 are irradiation ranges used for the driver to visually recognize the surroundings of the vehicle 1 or for the camera 6 to capture an image. When the rotating reflector 3033 is rotated while the six visible light LEDs 3031 are lighted, a region Q01a irradiated with visible light by the six visible light LEDs 3031 gradually moves from left to right.

The range Q01 is a range irradiated with visible light when the visible light LED 3031 is lighted until the rotating reflector 3033 is rotated by ⅓. The visible light emitted from the visible light LED 3031 is reflected by a first blade of the rotating reflector 3033, and the visible light is swept in the range Q01.

The range Q02 is a range irradiated with visible light when the visible light LED 3031 is lighted while the rotating reflector 3033 is rotated by ⅓ to ⅔. The visible light emitted from the visible light LED 3031 is reflected by a second blade of the rotating reflector 3033, and the visible light is swept in the range Q02.

The range Q03 is a range irradiated with visible light when the visible light LED 3031 is lighted while the rotating reflector 3033 is rotated by ⅔ to 1 turn. The visible light emitted from the visible light LED 3031 is reflected by a third blade of the rotating reflector 3033, and the visible light is swept in the range Q03.

Each of the ranges Q01 to Q03 is a band-shaped region extending in the left-right direction. The range Q03 located at a lowermost position is preferably a region including the line H. The control unit 3101 can control the lighting timing of the visible light LED 3031 and the rotation phase of the rotating reflector 3033 so as to irradiate any region as desired with visible light in the ranges Q01 to Q03 on the lamp front side.

Ranges Q11, Q12, and Q13 are irradiation ranges of the infrared light emitted from the infrared LD 3032 of the second board 3037. Similarly to the ranges Q01 to Q03, the ranges Q11, Q12, and Q13 are irradiated with the infrared light of the infrared LD 3032 according to the rotation phase of the rotating reflector 3033.

That is, the range Q11 is a range irradiated with infrared light when the infrared LD 3032 is lighted until the rotating reflector 3033 is rotated by ⅓. The infrared light emitted from the infrared LD 3032 is reflected by the first blade of the rotating reflector 3033, and the infrared light is swept in the range Q11.

The range Q12 is a range irradiated with infrared light when the infrared LD 3032 is lighted while the rotating reflector 3033 is rotated by ⅓ to ⅔. The infrared light emitted from the infrared LD 3032 is reflected by the second blade of the rotating reflector 3033, and the infrared light is swept in the range Q12.

The range Q13 is a range irradiated with infrared light when the infrared LD 3032 is lighted while the rotating reflector 3033 is rotated by ⅔ to 1 turn. The infrared light emitted from the infrared LD 3032 is reflected by the third blade of the rotating reflector 3033, and the infrared light is swept in the range Q13.

Each of the ranges Q11 to Q13 is a linear region extending in the left-right direction. The range Q11 is preferably provided in the range Q01, the range Q12 is preferably provided in the range Q02, and the range Q13 is preferably provided in the range Q03.

Each of the linear regions of the ranges Q11 to Q13 preferably has an up-down width of 0.4 degree or more in the vertical direction. The control unit 3101 controls the lighting timing of the infrared LD 3032 and the rotation phase of the rotating reflector 3033 such that the infrared LD 3032 can irradiate any position as desired in the ranges Q11 to Q13 with infrared light.

When an object such as an oncoming vehicle is present on the lamp front side, the infrared light emitted from the infrared LD 3032 is reflected by the object, and thus reflected light having high intensity is detected by the infrared sensor 3035. A relationship between the rotation phase of the rotating reflector 3033 and a region irradiated with visible light and infrared light at that time is recorded in a memory. The control unit 3101 can access the memory. The control unit 3101 lights the infrared LD 3032 and rotates the rotating reflector 3033 at first, and then acquires output of the infrared sensor 3035. When the infrared sensor 3035 outputs a signal having signal intensity equal to or higher than a predetermined value, the control unit acquires the rotation phase of the rotating reflector 3033 at that time, and specifies a region (position) irradiated with infrared light at that time. The control unit 3101 determines that an object is present in the specified region (position). When the signal intensity of the output of the infrared sensor 3035 is less than the predetermined value, the control unit 3101 determines that no object is present in the corresponding region.

FIG. 26 shows an example of a light distribution pattern obtained by controlling the visible light LED 3031 by the control unit 3101. In order to form the light distribution pattern as shown in FIG. 26, the control unit 3101 performs control as follows.

For example, as shown in FIG. 26, when it is determined that the other vehicle Z is present in the ranges Q01 to Q03 which are the irradiation ranges of the visible light, the control unit 3101 sets the dimming region T in a predetermined region including the other vehicle Z and sets the normal region S in the other region. The control unit 3101 supplies a current having a first current value to the visible light LED 3031 to irradiate the normal region S with visible light having predetermined illuminance. The control unit 3101 supplies a current having a second current value smaller than the first current value to the visible light LED 3031 to irradiate the dimming region T with visible light having illuminance lower than that of the normal region S. As a result, a highly visible light distribution pattern that does not give glare to the other vehicle Z and brightly illuminates a wider range is formed.

Incidentally, in a vehicle lamp, it is necessary to mount a plurality of components constituting the lamp in a bent space such as a corner portion like a right end portion or a left end portion of a front end portion or a rear end portion of the vehicle, or in a narrow space such as a space between a grille and a bonnet, or the like. On the other hand, in the vehicle lamp, it is necessary to design an optical system including a light source, a reflecting member, a lens member, and the like so as to obtain a desired image. For this reason, in a lamp including two types of light sources including at least a sensor light source for sensing an object to be detected, a plurality of optical systems are required, thus the lamp is likely to have increased size, and thus is not easily installed on a vehicle.

In regard of this, the optical-sensor-equipped lamp 3004 according to the present invention is configured such that the second board 3037 on which the infrared LD 3032 for sensing an object such as another vehicle is mounted is disposed behind the first board 3036 on which the visible light LED 3031 for illuminating the front of the vehicle is mounted, and the infrared light of the infrared LD 3032 is passed to the front of the first board 3036 through the gap portion 3039 formed in the first board 3036. As a result, an optical system including the visible light LED 3031 and an optical system including the infrared LD 3032 can be integrated into a single optical system, and the rotating reflector for reflecting the visible light of the visible light LED 3031 and the projection lens 3034 for projecting the visible light can be made common to those members for reflecting and projecting the infrared light of the infrared LD 3032. In addition, an inside of the optical-sensor-equipped lamp 3004 can be constituted by the single lamp chamber 3030c. Therefore, even in the optical-sensor-equipped lamp 3004 including the two types of light sources, it is possible to prevent an increase in a size of the lamp 3004, and thus installation on the vehicle 1 can be improved.

In addition, the visible light LED 3031 mounted on the first board 3036 is provided at the position closer to the focal plane P passing through the virtual focal point F of the projection lens 3034 than the infrared LD 3032 mounted on the second board 3037. Therefore, the visible light emitted from the visible light LED 3031 can be radiated to the lamp front side without being diffused. In addition, the infrared LD 3032, which is less likely to diffuse than the visible light LED 3031, is mounted on the second board 3037 disposed behind the first board 3036. Therefore, even though the infrared LD 3032 is provided at the position away from the focal plane P of the projection lens 3034, the infrared light of the infrared LD 3032 can be radiated to the lamp front side without being diffused.

In addition, the infrared LD 3032 is provided with the collimating lens 3038 that converts the infrared light emitted from the infrared LD 3032 into a parallel beam. Therefore, directivity of the infrared light emitted from the infrared LD 3032 can be improved, and the infrared light can be radiated only to a specific region, so that detection accuracy of the infrared sensor 3035 can be improved.

It should be noted that the present invention is not limited to the above-described embodiment, and modifications, improvements, and the like can be made as appropriate. In addition, materials, shapes, dimensions, numerical values, forms, numbers, arrangement places, and the like of the respective constituent elements in the above-described embodiment are set as desired and are not limited as long as the present invention can be achieved.

In the above embodiment, the one gap portion 3039 is formed in the central portion of the first board 3036, and the one infrared LD 3032 is mounted on the second board 3037. However, the present invention is not limited thereto. For example, a plurality of the gap portions 3039 may be provided in the first board 3036, and the infrared LD 3032 may be visually recognized from each of the gap portions 3039 in a front view of the first board 3036. Alternatively, in the front view of the first board 3036, a plurality of the infrared LDs 3032 may be visually recognized from a single gap portion 3039.

In addition, although the second light source 3032 is constituted by the infrared LD in the above-described embodiment, the present invention is not limited thereto. For example, the second light source 3032 may be constituted by an LED that emits infrared light.

Although the first light source 3031 is constituted by the visible light LED, and the second light source 3032 is constituted by the infrared LD in the above-described embodiment, the present invention is not limited thereto. For example, the first light source 3031 may be constituted by an infrared LED, and the second light source 3032 may be constituted by an infrared LD having a peak at a wavelength different from a peak wavelength of infrared light emitted from the first light source 3031. In this case, an image corresponding to reflected light of the infrared light emitted from the infrared LED toward the lamp front side is captured by the infrared camera. The infrared camera has highest sensitivity to the peak wavelength of the infrared light emitted from the infrared LED. In addition, reflected light of infrared light emitted from the infrared LD 3032 toward the lamp front side is detected by the infrared sensor 3035. The infrared sensor 3035 has the highest sensitivity at the peak wavelength of the infrared light emitted from the infrared LD 3032. The control unit 3101 controls the infrared LED in accordance with the signal output from the infrared sensor 3035 so as to obtain a light distribution pattern suitable for imaging by the infrared camera. For example, the control unit 3101 sets a dimming region in a region where another vehicle is detected, and thus can prevent occurrence of halation in a portion corresponding to the other vehicle in an image captured by the infrared camera.

INDUSTRIAL APPLICABILITY

According to the present invention, it is possible to provide a vehicle infrared lamp system capable of detecting an object having low infrared reflection intensity while preventing occurrence of halation in an image captured by an infrared camera.

The invention claimed is:

1. A vehicle infrared lamp system mounted on a vehicle equipped with an infrared camera, comprising:
   an infrared light source configured to emit infrared light;
   an optical member configured to transmit the infrared light emitted from the infrared light source to a lamp front side;
   an other-vehicle position acquisition unit configured to acquire position information of an oncoming vehicle or a preceding vehicle; and
   a control unit configured to control a lighting state of the infrared light source based on the position information of the oncoming vehicle or the preceding vehicle acquired by the other-vehicle position acquisition unit such that a dimming region where radiant intensity of infrared light is lower than radiant intensity of any other region is formed on at least a part of the oncoming vehicle or the preceding vehicle.

2. The vehicle infrared lamp system according to claim 1, wherein the control unit acquires position information of a right end and a left end of the oncoming vehicle from the other-vehicle position acquisition unit, and the control unit sets a boundary line of the dimming region to be located leftward of the right end and rightward of the left end.

3. The vehicle infrared lamp system according to claim 1, wherein the control unit acquires a center position in a vehicle width direction of the oncoming vehicle from the other-vehicle position acquisition unit, and sets a boundary line of the dimming region at positions separated rightward and leftward each by a predetermined distance from the acquired center position.

4. The vehicle infrared lamp system according to claim 1,
   wherein the control unit controls the infrared light source such that the dimming region is formed on at least a part of the preceding vehicle when the position information of the preceding vehicle is acquired from the other-vehicle position acquisition unit, and
   wherein the control unit controls the infrared light source such that a light-shielded region that is not irradiated with infrared light is formed on at least a part of the oncoming vehicle when the position information of the oncoming vehicle is acquired from the other-vehicle position acquisition unit.

5. The vehicle infrared lamp system according to claim 4, further comprising:
a distance acquisition unit configured to acquire a distance between the preceding vehicle and the own vehicle,
wherein the control unit controls a dimming level of the infrared light source in accordance with the distance acquired by the distance acquisition unit.

6. The vehicle infrared lamp system according to claim 5, wherein the control unit increases the dimming level of the infrared light source as the distance acquired by the distance acquisition unit becomes shorter.

7. A vehicle infrared sensor system used in a vehicle equipped with an infrared camera and an infrared sensor, comprising:
an infrared light source;
an optical member configured to transmit infrared light emitted from the infrared light source to a lamp front side; and
a control unit configured to control a lighting state of the infrared light source,
wherein the control unit is configured to drive the infrared light source in a first mode suitable for imaging with the infrared camera and a second mode suitable for sensing with the infrared sensor, and
wherein the control unit sets a dimming region where radiant intensity of infrared light is lower than that of any other region when driving in the first mode in accordance with output of the infrared sensor.

8. The vehicle infrared sensor system according to claim 7, wherein switching between the first mode and the second mode is in conjunction with an exposure timing of the infrared camera.

9. The vehicle infrared sensor system according to claim 7,
wherein a plurality of the infrared light sources is configured to emit light in different directions such that a predetermined range on the lamp front side is irradiated by all of the infrared light sources, and
wherein the control unit is configured to control illuminance of a specific region on the lamp front side by controlling a lighting state of a specific infrared light source among the infrared light sources.

10. The vehicle infrared sensor system according to claim 7,
wherein the infrared sensor includes a condenser lens configured to condense reflected light of infrared light that is emitted from the infrared light source and incident from the lamp front side,
wherein the optical member is a projection lens,
wherein the infrared light source is disposed in the vicinity of a focal point of the projection lens,
wherein the infrared sensor is disposed in the vicinity of a focal point of the condenser lens, and
wherein the projection lens and the condenser lens are integrated with each other.

11. The vehicle infrared sensor system according to claim 10, further comprising:
a light shielding wall configured to prevent light emitted from the infrared light source from being directly incident on the infrared sensor.

12. The vehicle infrared sensor system according to claim 7,
wherein the infrared light source is subjected to PWM control, and
wherein a duty of a current supplied in the first mode is larger than a duty of a current supplied in the second mode.

13. The vehicle infrared sensor system according to claim 7,
wherein the infrared light source is subjected to PWM control, and
wherein an instantaneous current value supplied in the first mode is smaller than an instantaneous current value supplied in the second mode.

14. The vehicle infrared sensor system according to claim 7,
wherein the first mode and the second mode are different from each other in at least one of an energization time, a non-energization time, and an input current of an energization pulse to be input to the infrared light source, and
wherein the control unit changes at least one of the energization time, the non-energization time, and the input current of the energization pulse in accordance with output of the infrared sensor, and thus sets a dimming region where radiant intensity of infrared light is lower than that of any other region when driving in the first mode.

15. The vehicle infrared sensor system according to claim 7,
wherein the control unit performs control by inputting a pulse current to the infrared light source, and
wherein in the second mode, energization timings of pulse currents input to each of a plurality of the infrared light sources do not overlap with each other.

16. The vehicle infrared sensor system according to claim 7,
wherein in the first mode, the control unit simultaneously lights a plurality of the infrared light sources to irradiate all regions within an angle of view of the infrared camera with infrared light, and
wherein in the second mode, the control unit lights only one of the infrared light sources at each moment and sequentially changing the infrared light source to be lighted so as to detect presence or absence of reflected light of infrared light from any direction by the infrared sensor, and thus detect presence or absence and a position of an object on the lamp front side.

* * * * *